(12) United States Patent
Faler et al.

(10) Patent No.: US 10,544,244 B2
(45) Date of Patent: Jan. 28, 2020

(54) BRIDGED BIPHENYL PHENOL TRANSITION METAL COMPLEXES, PRODUCTION AND USE THEREOF

(71) Applicant: ExxonMobil Chemical Patents Inc., Baytown, TX (US)

(72) Inventors: Catherine A. Faler, Houston, TX (US); Charles J. Harlan, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/004,847

(22) Filed: Jun. 11, 2018

(65) Prior Publication Data

US 2019/0040165 A1    Feb. 7, 2019

Related U.S. Application Data

(60) Provisional application No. 62/540,455, filed on Aug. 2, 2017.

(51) Int. Cl.
*C08F 110/02*    (2006.01)

(52) U.S. Cl.
CPC ................ *C08F 110/02* (2013.01)

(58) Field of Classification Search
None
See application file for complete search history.

(56) References Cited

U.S. PATENT DOCUMENTS

| 2005/0080281 | A1 | 4/2005 | Boussie et al. |
| 2014/0329921 | A1* | 11/2014 | Robert ............... C08F 110/02 521/143 |
| 2015/0322184 | A1 | 11/2015 | Hlavinka et al. |

FOREIGN PATENT DOCUMENTS

WO    2017/058981    4/2017

* cited by examiner

*Primary Examiner* — Catherine S Branch
(74) *Attorney, Agent, or Firm* — Catherine L. Bell

(57) ABSTRACT

The present disclosure provides catalysts having a homoallylic bridge (and/or naphthyl moieties) located at a certain position on the catalysts which provides catalyst productivity values of 10,000 gPgcat$^{-1}$hr$^{-1}$ or greater and polyolefins, such as polyethylene, having an Mn of 100,000 g/mol or greater, Mw of 500,000 g/mol or greater, and an Mw/Mn value of about 1.5 to about 5. Catalyst systems including the catalysts, polymerization processes using the catalysts, and polymers made using the catalysts are also described.

32 Claims, 1 Drawing Sheet

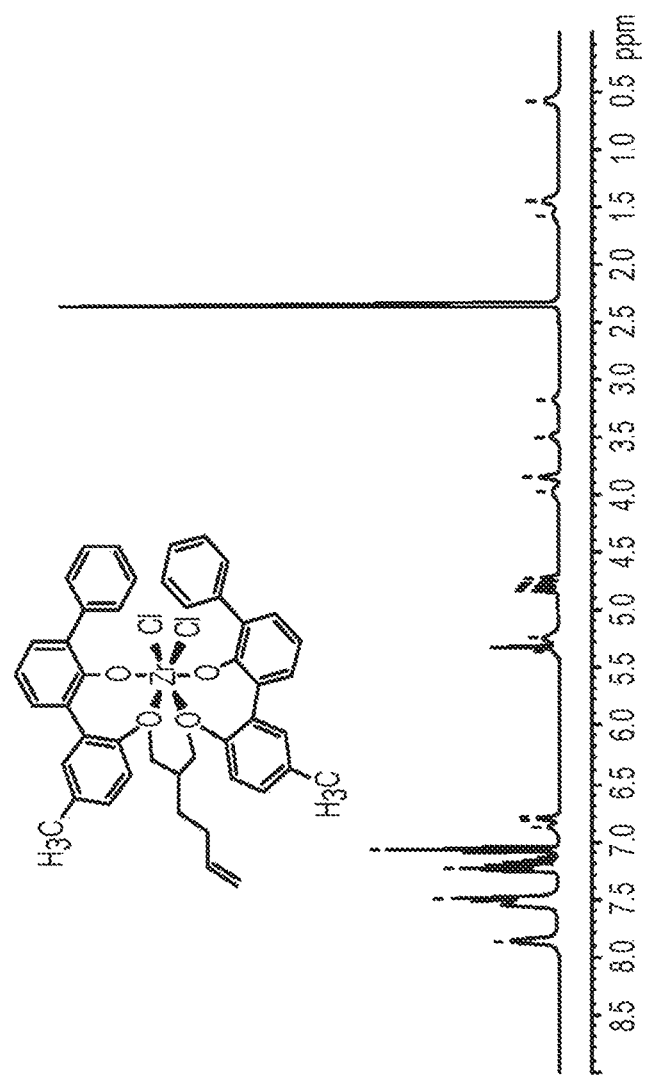

BRIDGED BIPHENYL PHENOL TRANSITION METAL COMPLEXES, PRODUCTION AND USE THEREOF

PRIORITY CLAIM

This application claims priority to and the benefit of U.S. Ser. No. 62/540,455, filed Aug. 2, 2017 and are incorporated by reference in their entirety.

FIELD OF THE INVENTION

The present disclosure provides catalyst compounds comprising bridged biphenyl phenol transition metal complexes, production, and use thereof.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers. Therefore, there is interest in finding new catalysts and catalyst systems that provide polymers having improved properties.

Low density polyethylene is generally prepared at high pressure using free radical initiators, or in gas phase processes using Ziegler-Natta or vanadium catalysts. Low density polyethylene typically has a density in the range of 0.916 to 0.950 g/cm³. Typical low density polyethylene produced using free radical initiators is known in the industry as "LDPE." LDPE is also known as "branched" or "heterogeneously branched" polyethylene because of the relatively large number of long chain branches extending from the main polymer backbone. Polyethylene in the same density range, e.g., 0.916 to 0.940 g/cm³, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a $g'_{vis}$ value of 0.97 or above, such as 0.98 or above. Polyethylenes having still greater density are the high density polyethylenes ("HDPEs"), e.g., polyethylenes having densities greater than 0.940 g/cm³, and are generally prepared with Ziegler-Natta catalysts or chrome catalysts. Very low density polyethylenes ("VLDPEs") can be produced by a number of different processes yielding polyethylenes having a density less than 0.916 g/cm³, typically 0.890 to 0.915 g/cm³ or 0.900 to 0.915 g/cm³.

Polyolefins, such as polyethylene, which have high molecular weight, generally have desirable mechanical properties as compared to their lower molecular weight counterparts. However, high molecular weight polyolefins can be difficult to process and can be costly to produce. As used herein, "high molecular weight" is defined as a number average molecular weight (Mn) value of 100,000 g/mol or more. "Low molecular weight" is defined as an Mn value of less than 100,000 g/mol.

Nonetheless, polyolefin compositions formed by catalysts capable of forming high molecular weight polyolefins typically also have a broad molecular weight distribution, as indicated by high polydispersity indices, and/or the polyolefins are of such high molecular weight (e.g., Mw of 1,500,000 g/mol) as to have processing difficulties due to hardness. Furthermore, catalysts capable of forming high molecular weight polyolefins typically have low polymer productivity.

There is a need for catalysts capable of forming polyolefins, such as polyethylene, with high molecular weight and narrow molecular weight distribution capable of high polyolefin productivity.

References of interest include: US 2015/0322184.

SUMMARY OF THE INVENTION

The present disclosure provides catalyst compounds represented by Formula (I):

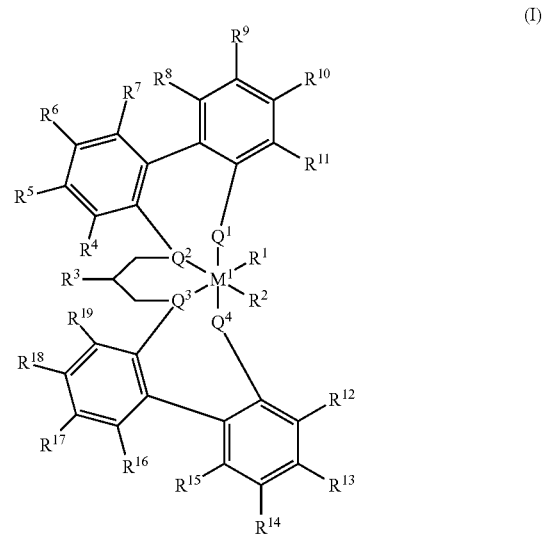

(I)

wherein:

$M^1$ is selected from the group consisting of titanium, zirconium, hafnium, vanadium, niobium, tantalum, chromium, molybdenum and tungsten;

each of $Q^1$, $Q^2$, $Q^3$, and $Q^4$ is independently oxygen or sulfur;

$R^1$ and $R^2$ are independently hydrogen, halogen, hydroxyl, hydrocarbyl, or substituted hydrocarbyl;

$R^3$ is a $C_1$-$C_{40}$ unsaturated alkyl or substituted $C_1$-$C_{40}$ unsaturated alkyl; and each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring.

In yet another embodiment, the present disclosure provides a catalyst system comprising an activator and a catalyst of the present disclosure.

In yet another embodiment, the present disclosure provides a catalyst system comprising an activator, a catalyst support, and a catalyst of the present disclosure.

In still another embodiment, the present disclosure provide a polymerization process comprising a) contacting one or more olefin monomers with a catalyst system comprising: i) an activator, ii) a catalyst of the present disclosure, and iii) optional support.

BRIEF DESCRIPTION OF THE FIGURE

The FIGURE is a $^1$H NMR spectrum of Catalyst Compound 2.

DETAILED DESCRIPTION

Catalysts of the present disclosure preferably have a homoallylic bridge (and/or naphthyl moieties) located at a certain position on the catalysts which provides catalyst productivity values of 10,000 gPgcat$^{-1}$hr$^{-1}$ or greater and polyolefins, such as polyethylene, having an Mn of 100,000 g/mol or greater, Mw of 500,000 g/mol or greater, and a polydispersity index of about 5 or less.

The specification describes catalysts that can be transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

For the purposes of the present disclosure, the numbering scheme for the Periodic Table Groups is used as described in Chemical and Engineering News, 63(5), pg. 27 (1985). Therefore, a "Group 4 metal" is an element from Group 4 of the Periodic Table, e.g., Hf, Ti, or Zr.

The following abbreviations are used through this specification: o-biphenyl is an ortho-biphenyl moiety represented by the structure

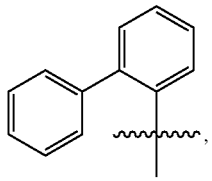 [SMILES: *c1ccccc1-c1ccccc1]

dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, and Cy is cyclohexyl.

The term "substituted" means that at least one hydrogen atom has been replaced with at least a non-hydrogen group, such as a hydrocarbyl group, a heteroatom, or a heteroatom containing group, such as halogen (such as Br, Cl, F, or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The terms "hydrocarbyl radical," "hydrocarbyl," "hydrocarbyl group," are used interchangeably throughout this disclosure. Likewise, the terms "group," "radical," and "substituent" are also used interchangeably in this disclosure. For purposes of this disclosure, "hydrocarbyl radical" is defined to be C$_1$-C$_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as a hydrocarbyl group, a heteroatom, or a heteroatom containing group, such as halogen (such as Br, Cl, F, or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, ethylbenzyl indenyl is an indene substituted with an ethyl group bound to a benzyl group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

Noncoordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. The term non-coordinating anion activator includes neutral activators, ionic activators, and Lewis acid activators.

In the description herein, a metallocene catalyst may be described as a catalyst precursor, a pre-catalyst compound, metallocene catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of the present disclosure, in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1}hr^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole of catalyst (cat) used (kgP/molcat).

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and the derived units are present at 35 wt % to 55 wt %, based upon the weight of the copolymer.

For purposes herein a "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

The term "continuous" means a system that operates without interruption or cessation for a period of time, preferably where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.* (2000), 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Catalysts

In at least one embodiment, the present disclosure provides catalysts having a homoallylic bridge (and/or naphthyl moieties) located at a certain position on the catalysts. In at least one embodiment, the homoallylic moiety is bound to two oxygen atoms to form an alkenyl-containing bisether bridge.

In at least one embodiment, the present disclosure provides a catalyst compound, and catalyst systems comprising such compounds, represented by the formula (I):

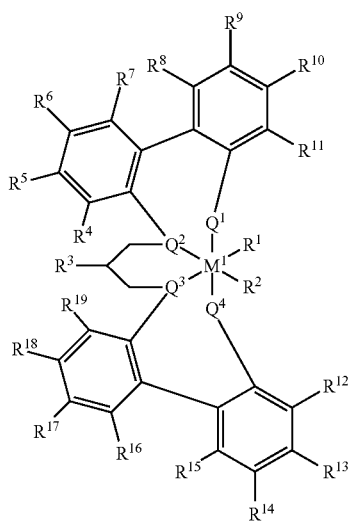

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. Preferably, $R^1$ and $R^2$ are chlorine.

Alternatively, $R^1$ and $R^2$ may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis(trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

Preferably, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. Preferably, $R^6$ and $R^{17}$ are $C_{1\text{-}40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

Preferably, $R^3$ is a hydrocarbyl comprising a vinyl moiety. As used herein, "vinyl" and "vinyl moiety" are used interchangeably and include a terminal alkene, e.g. represented by the structure

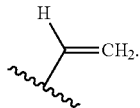

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). Preferably, $R^3$ is $C_1$-$C_{40}$ unsaturated alkyl that is vinyl or substituted $C_1$-$C_{40}$ unsaturated alkyl that is vinyl. $R^3$ can be represented by the structure —R'CH=CH$_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the present disclosure provides a catalyst compound, and catalyst systems comprising such compounds, represented by the formula (II):

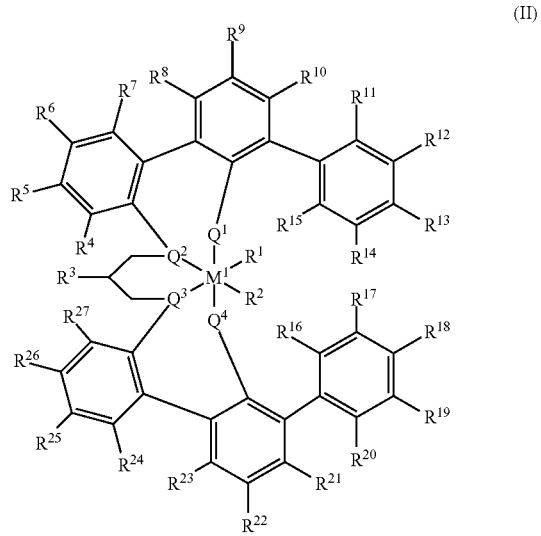

(II)

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ is independently oxygen or sulfur. In at least one embodiment, $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. Preferably, $R^1$ and $R^2$ are chlorine.

Alternatively, $R^1$ and $R^2$ may also be joined together to form an alkanediyl group or a conjugated $C_4$-$C_{40}$ diene ligand which is coordinated to $M^1$, R1, and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and/or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

Preferably, $R^3$ is a hydrocarbyl comprising a vinyl moiety. Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). Preferably, $R^3$ is $C_1$-$C_{40}$ unsaturated alkyl that is vinyl or substituted $C_1$-$C_{40}$ unsaturated alkyl that is vinyl. $R^3$ can be represented by the structure H$_2$C=CHR'— where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{11}$ and $R^{12}$, $R^{12}$ and $R^{13}$, $R^{13}$ and $R^{14}$, $R^{14}$ and $R^{15}$, $R^{16}$ and $R^{17}$, $R^{17}$ and $R^{18}$, $R^{18}$ and $R^{19}$, $R^{19}$ and $R^{20}$, $R^{21}$ and $R^{22}$, $R^{22}$ and $R^{23}$, $R^{24}$ and $R^{25}$, $R^{25}$ and $R^{26}$, or $R^{26}$ and $R^{27}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, $R^6$ and $R^{25}$ are $C_{1-40}$ hydrocarbyl. In at least one embodiment, each of $R^4$, $R^5$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{26}$, and $R^{27}$ is hydrogen. Preferably each of $R^6$ and $R^{25}$ is $C_1$-$C_{40}$ hydrocarbyl and each of $R^4$, $R^5$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{26}$, $R^{27}$ is hydrogen.

In at least one embodiment, a catalyst compound represented by formula (I) or formula (II) is one or more of:

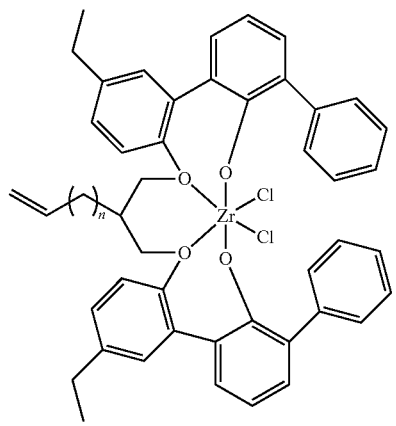

1

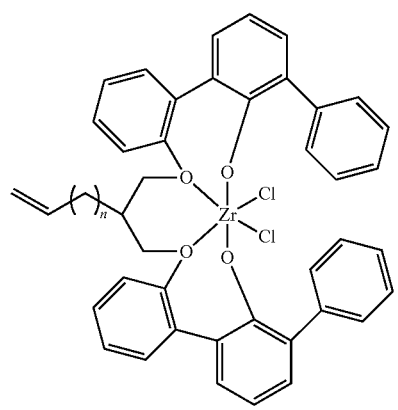

2

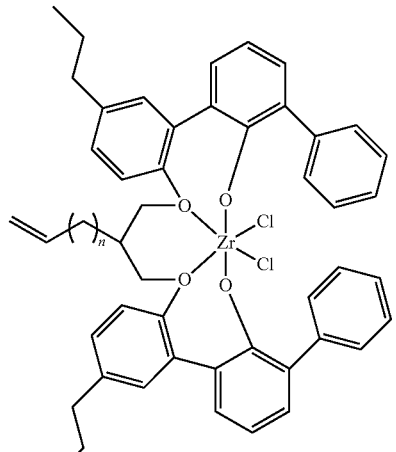

3

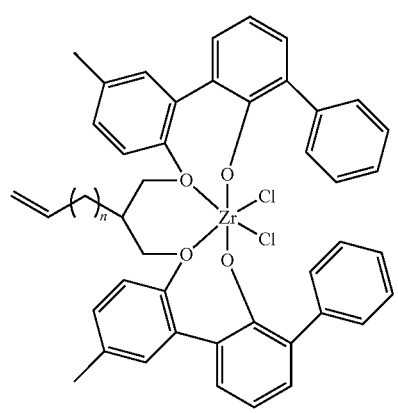

4

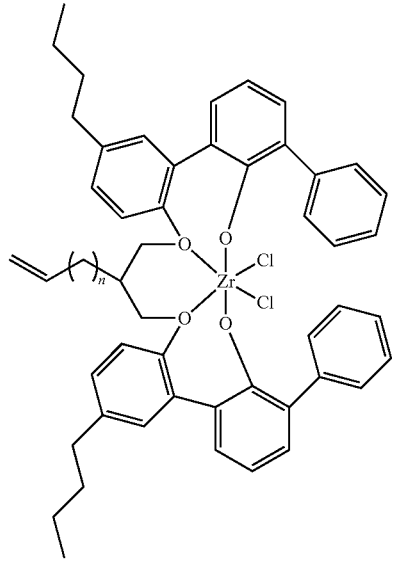

5

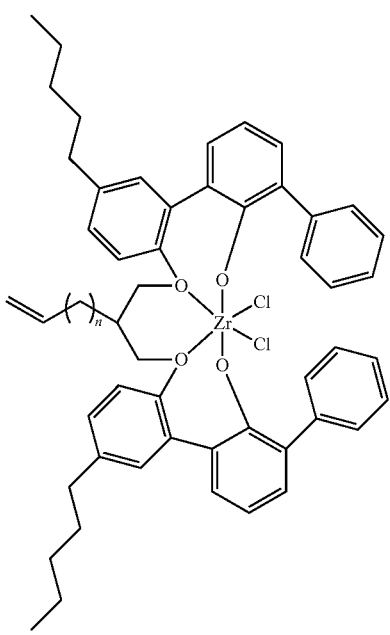
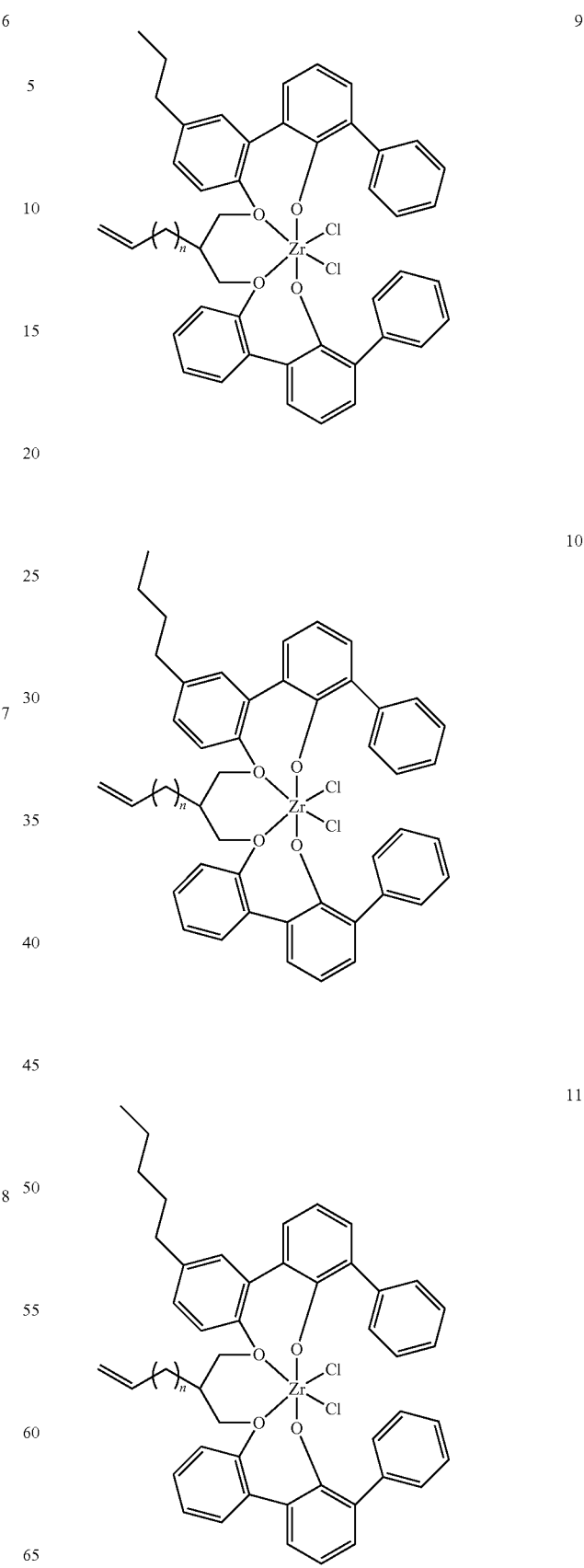

12
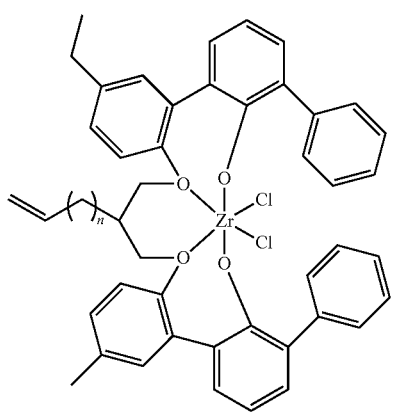
13
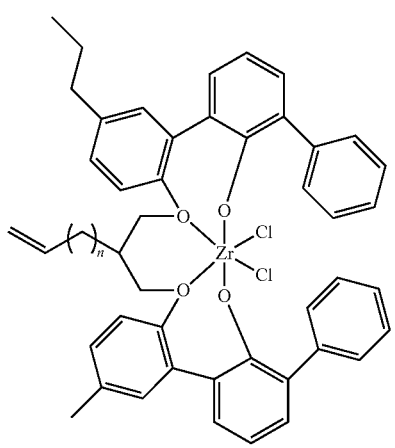
14
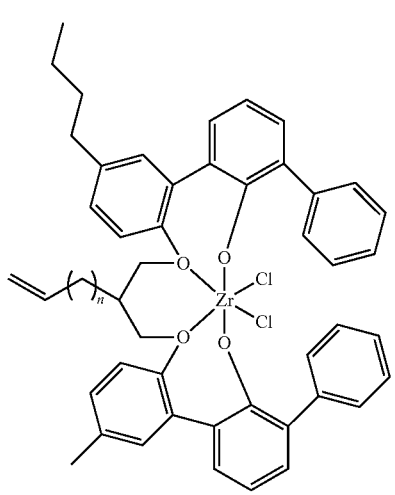
15
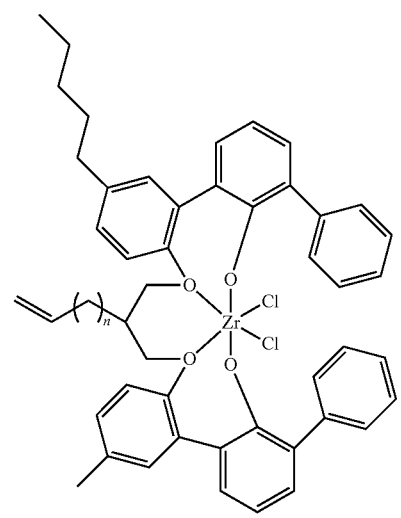
16
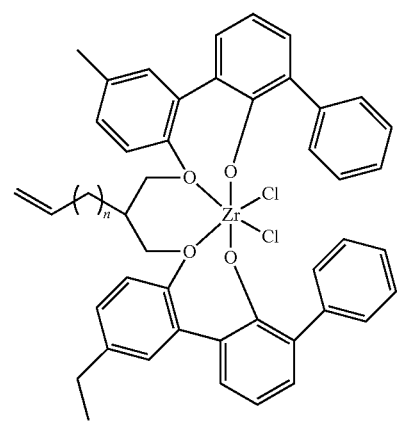
17
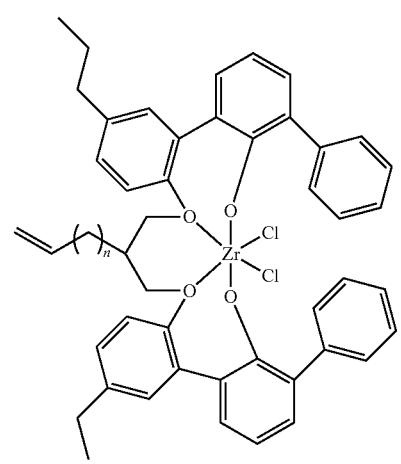

18
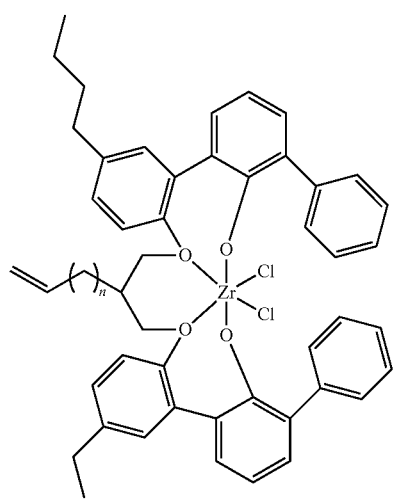
19
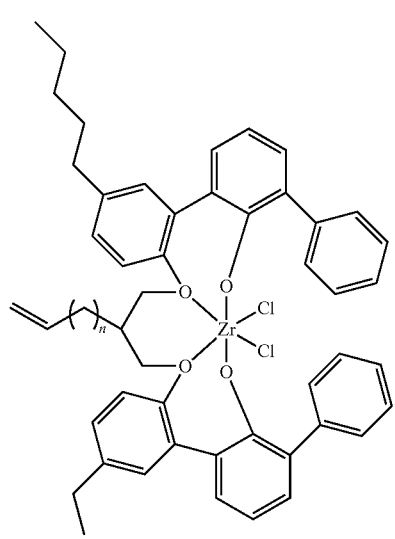
20
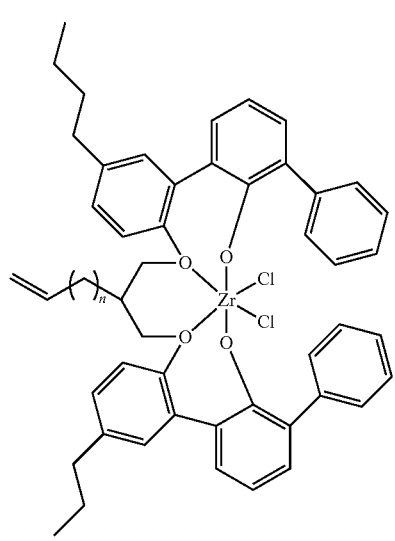
21
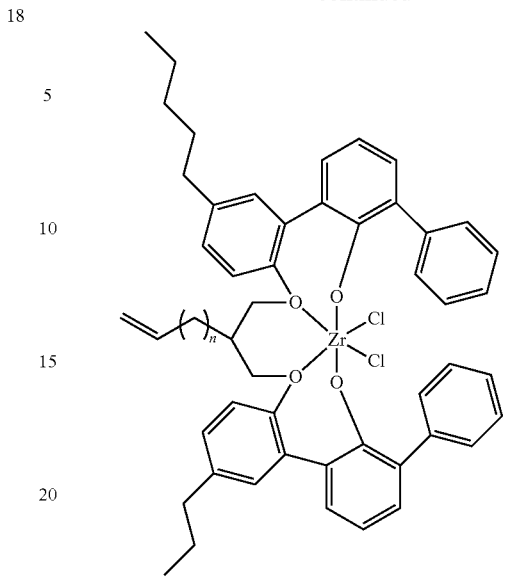
22
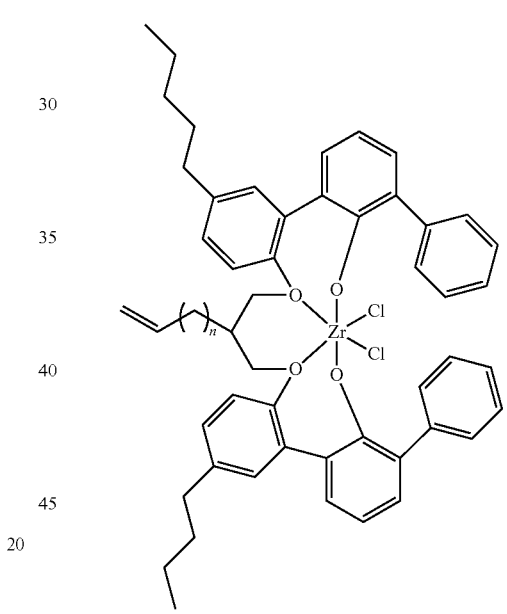
23
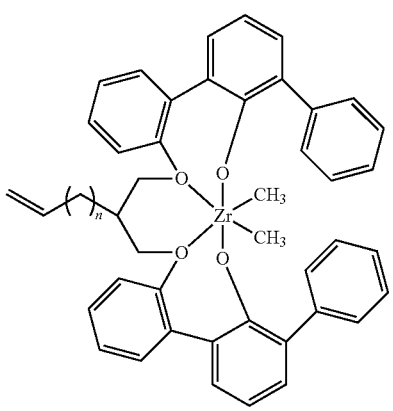

-continued
24
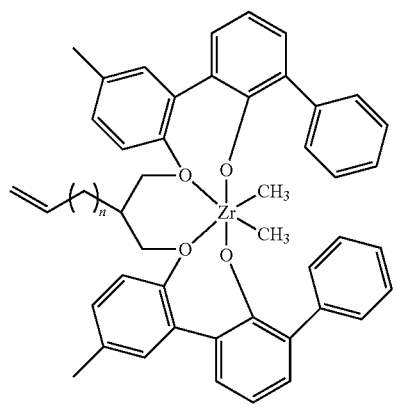
25
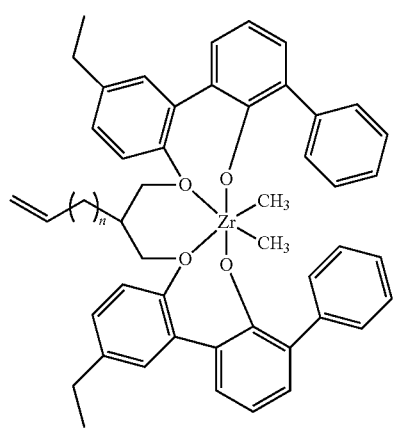
26
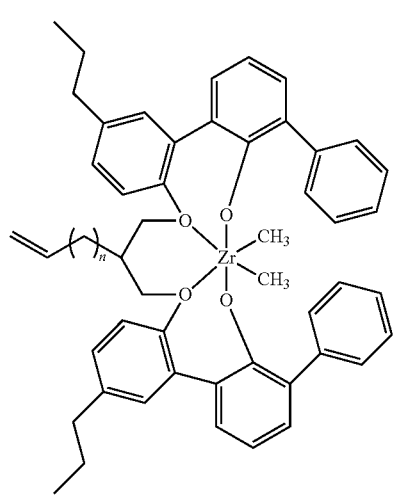
-continued
27
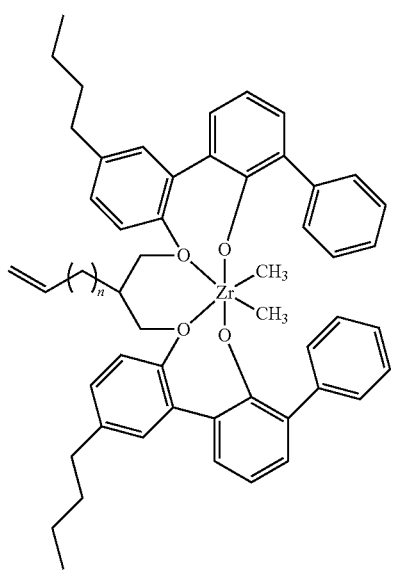
28
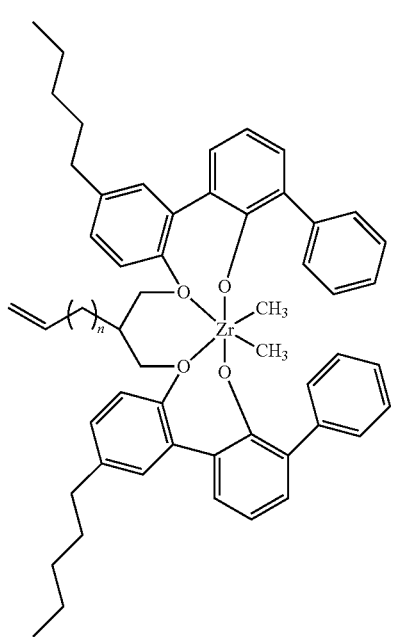
29
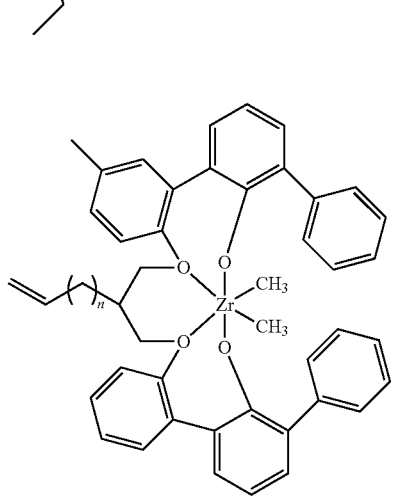

30
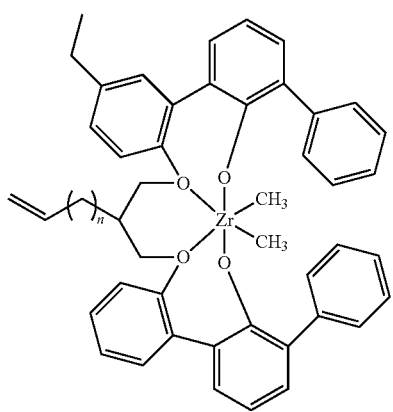
31
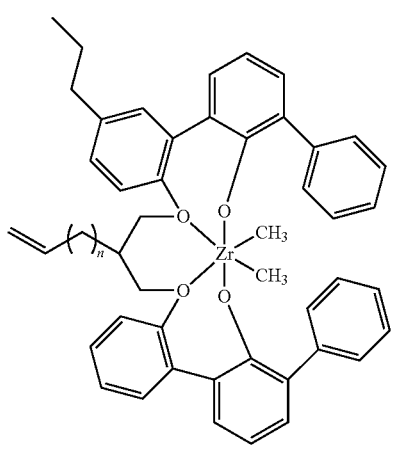
32
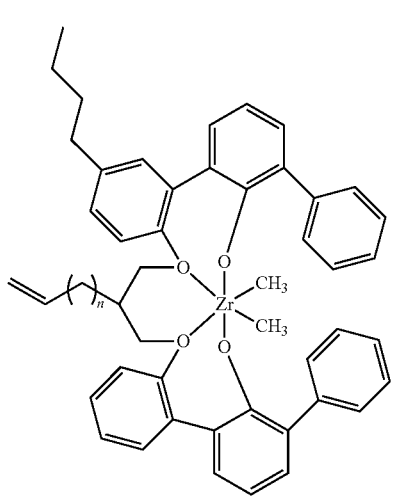
33
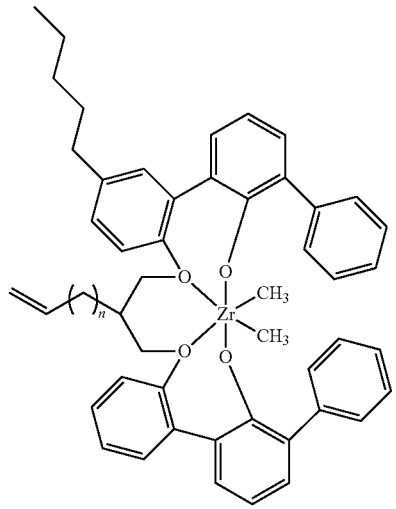
34
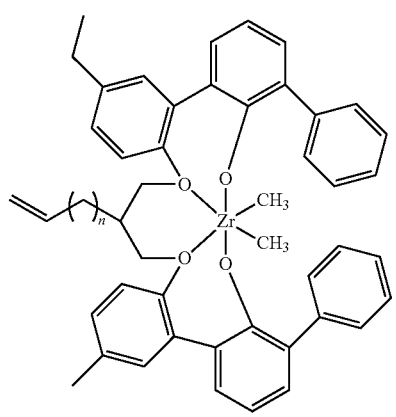
35
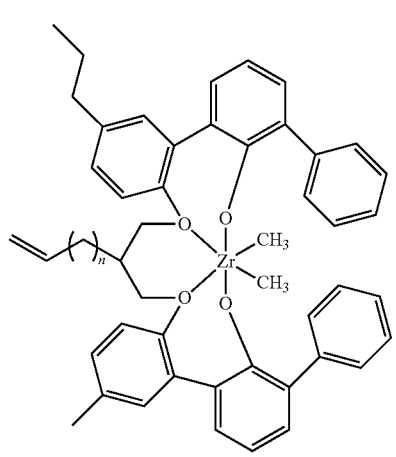

36
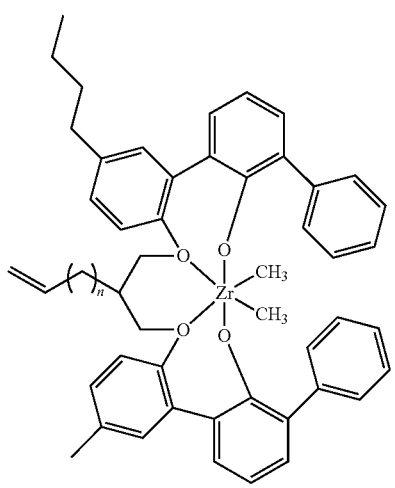
37
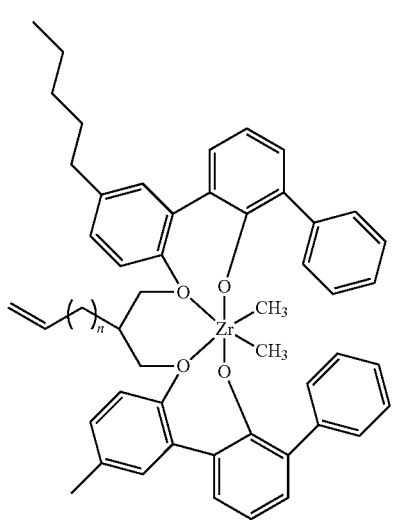
38
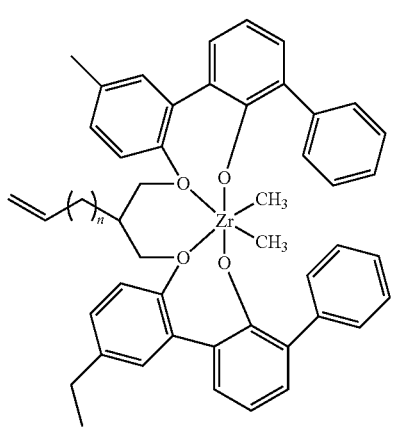
39
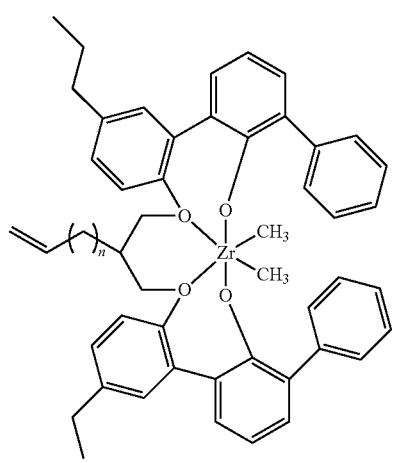
40
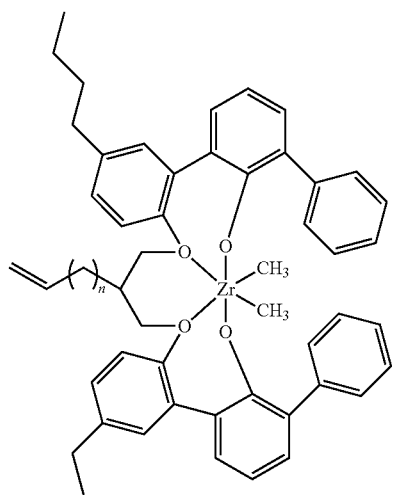
41
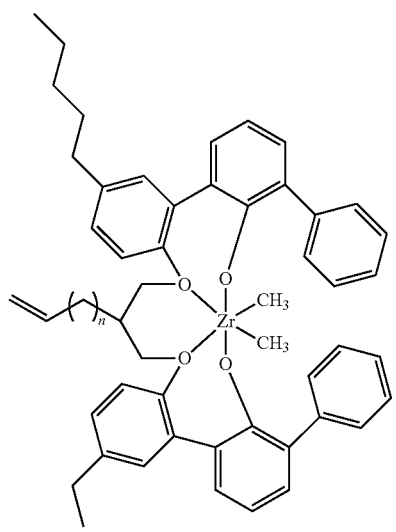

42
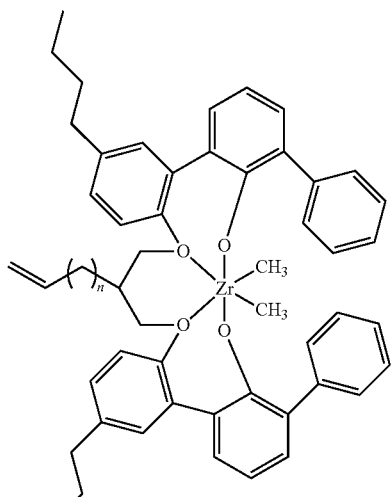
43
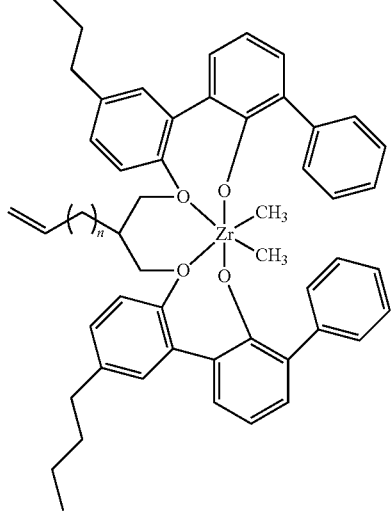
45
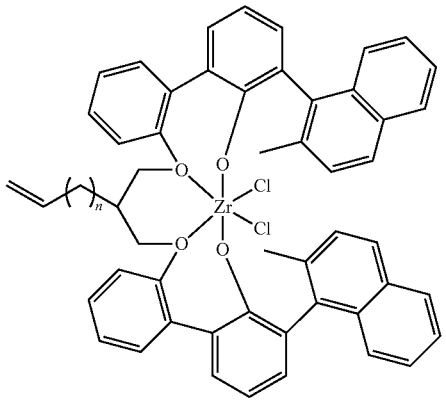
46
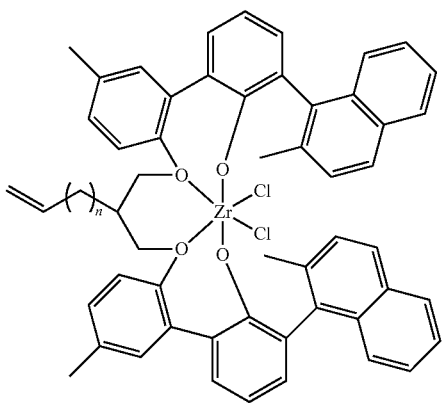
47
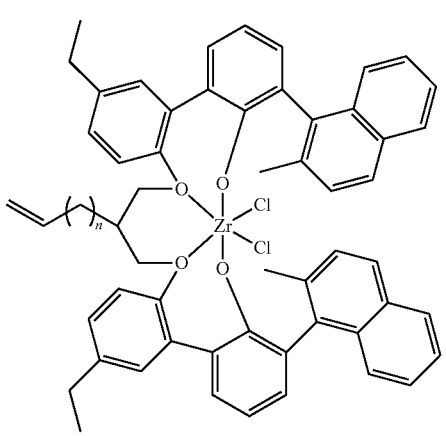

48
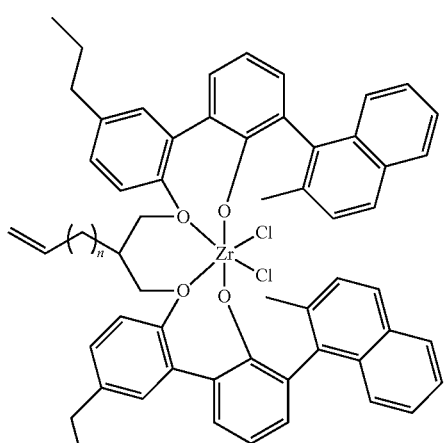
49
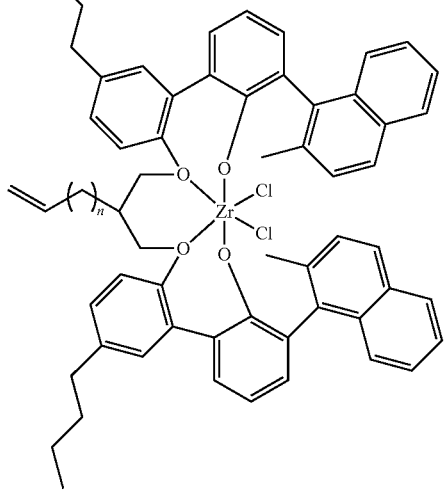
50
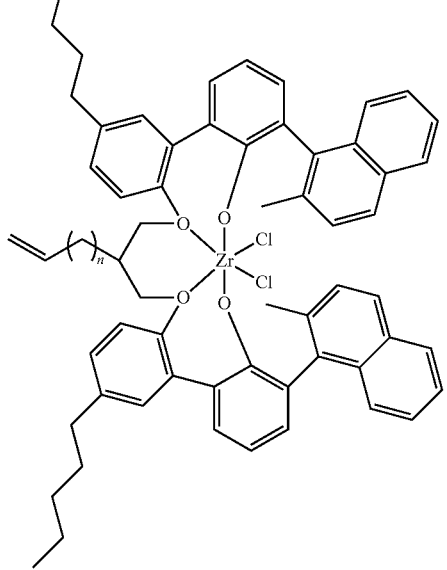
51
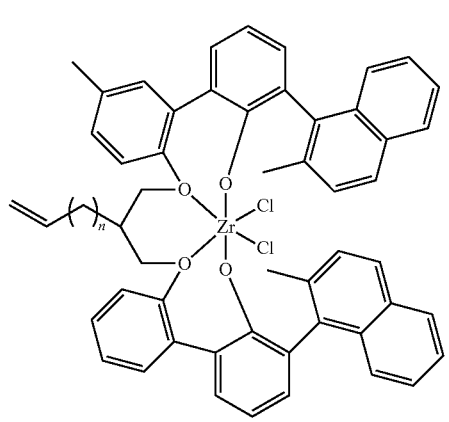
52
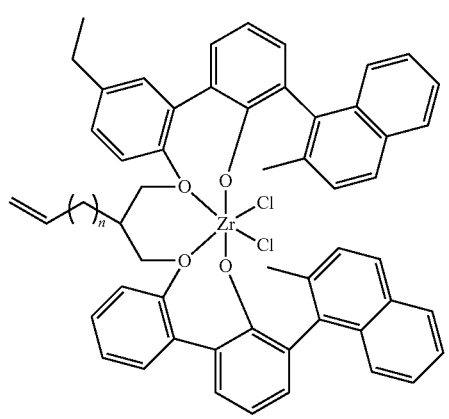
53

54
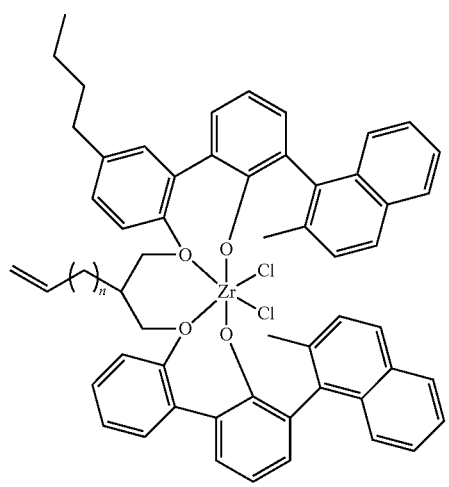
55
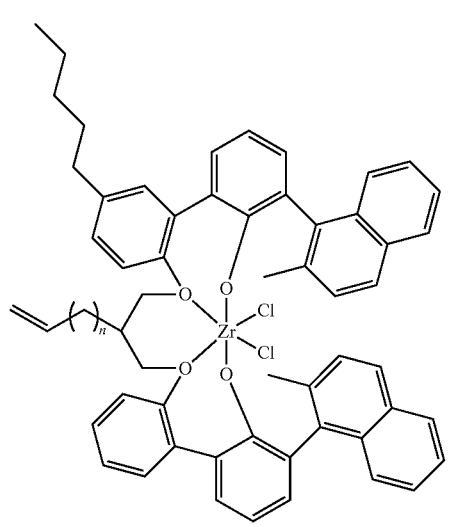
56
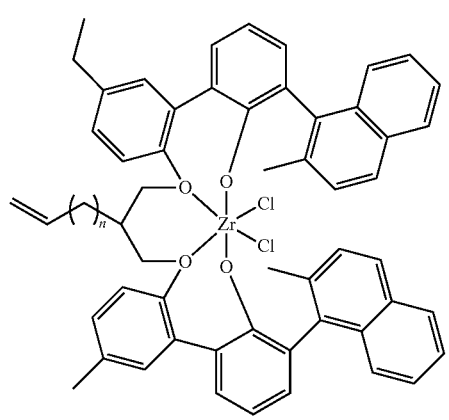
57
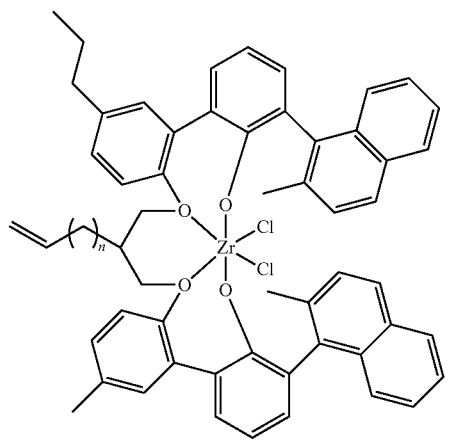
58
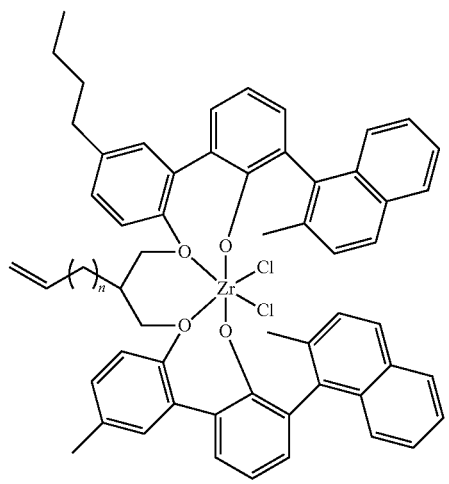
59
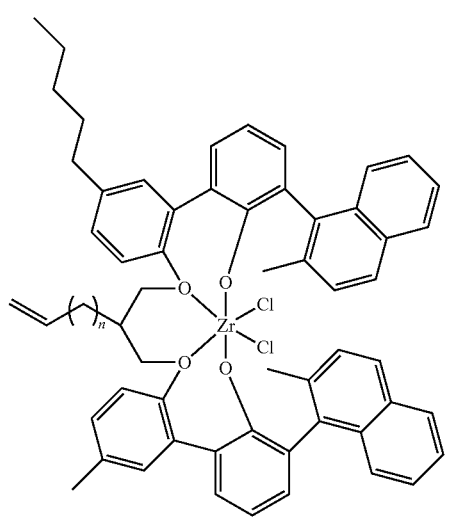

-continued
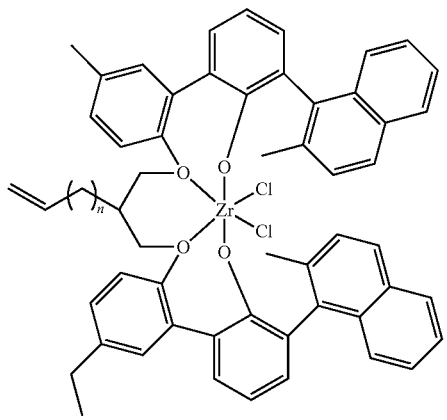
60
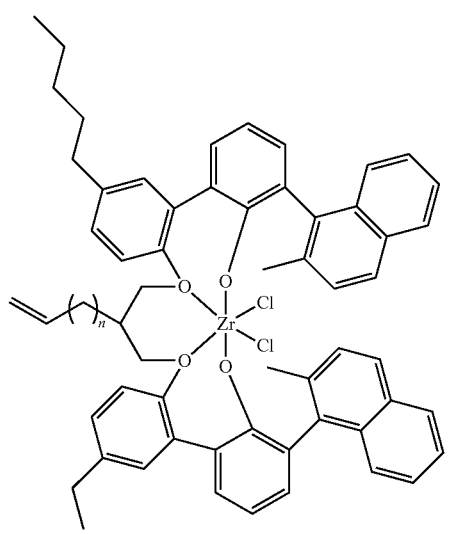
61
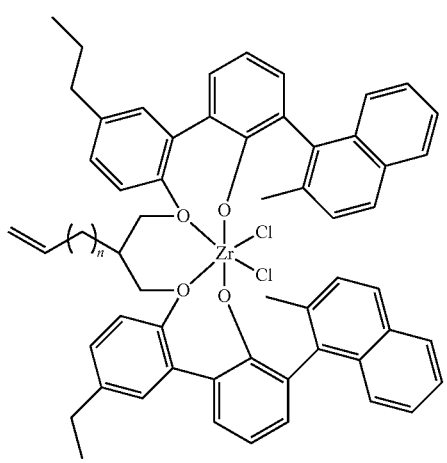
-continued
63
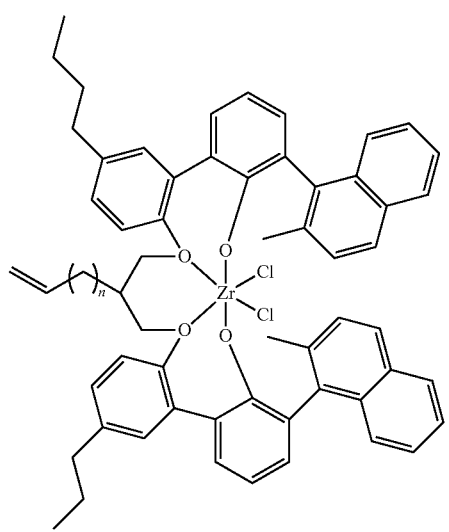
64
62
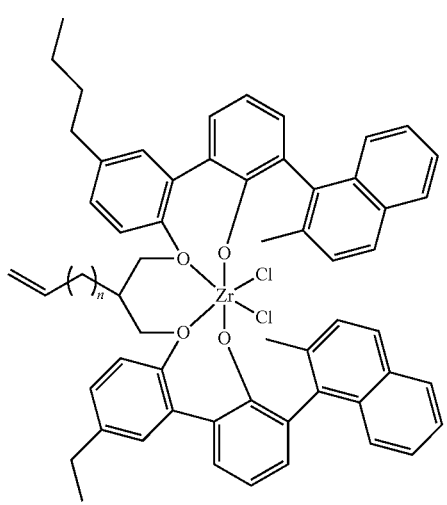
65
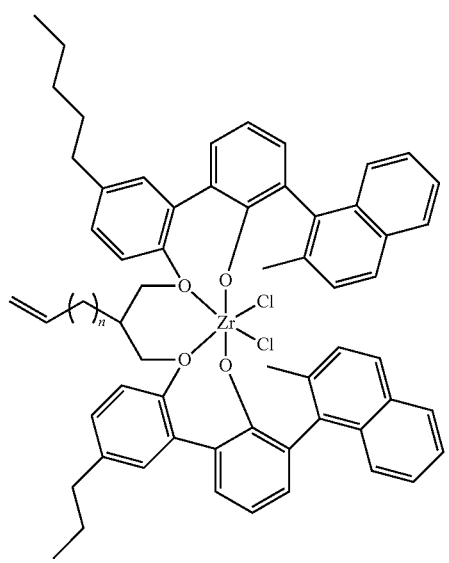

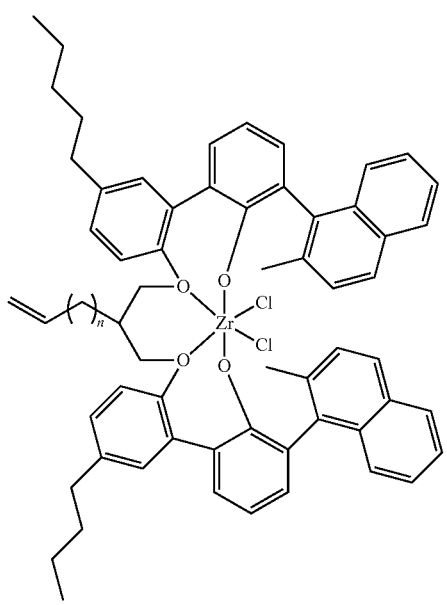
66
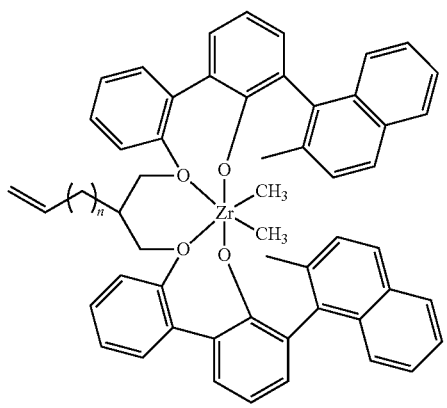
67
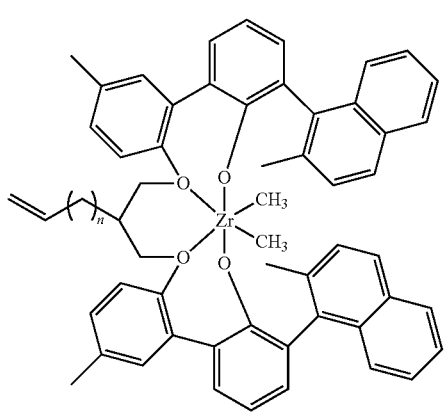
68
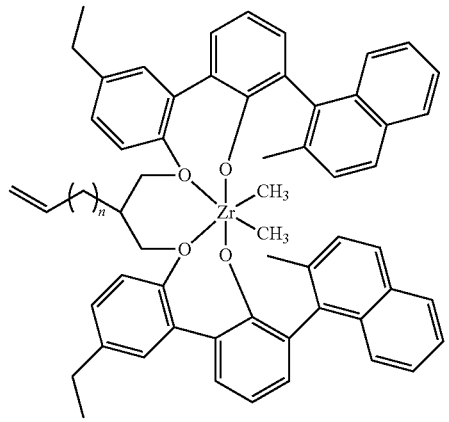
69
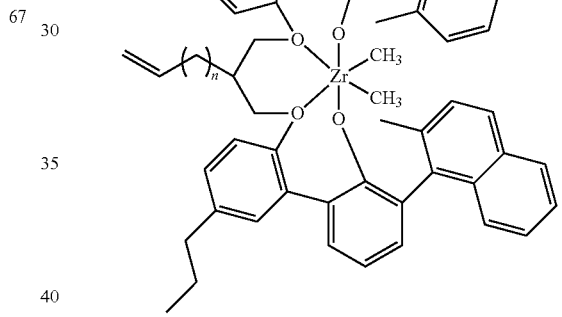
70
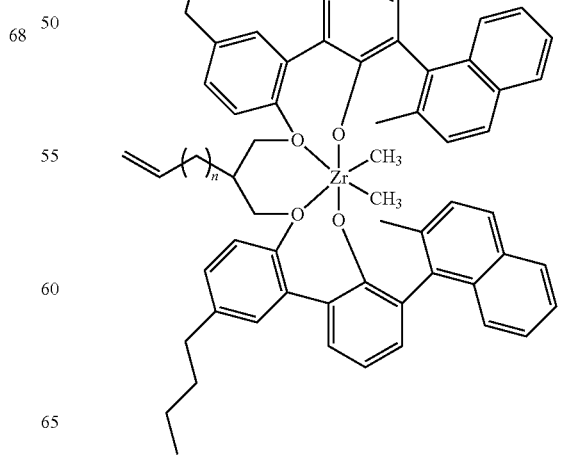
71

35
-continued
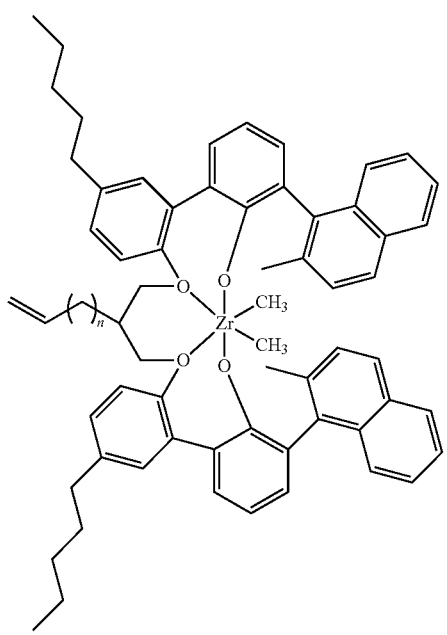
72
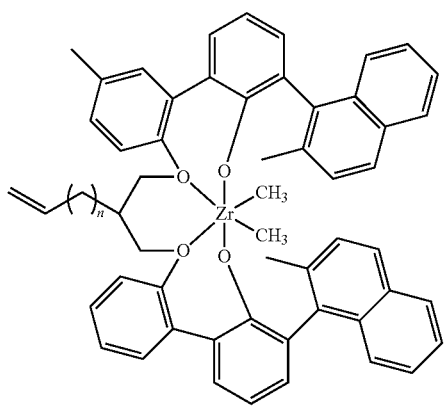
73
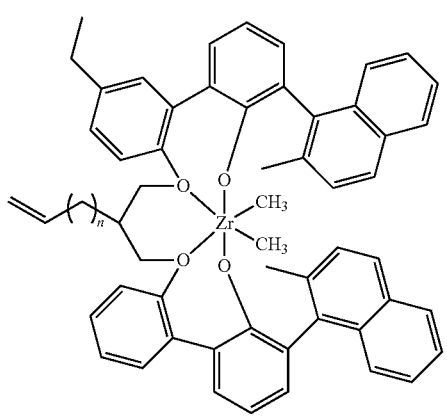
74
36
-continued
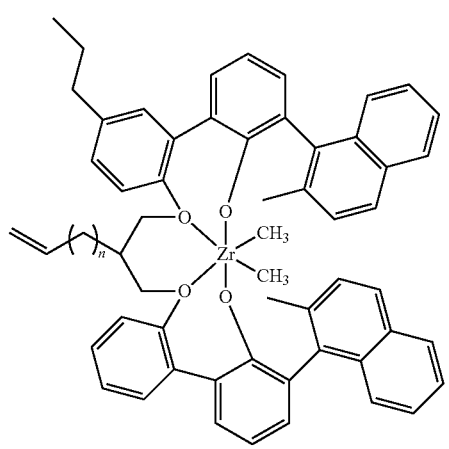
75
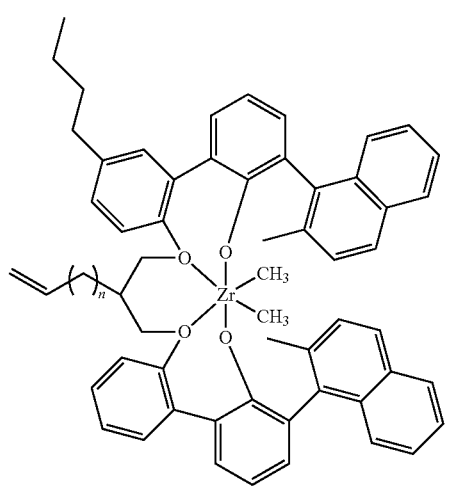
76
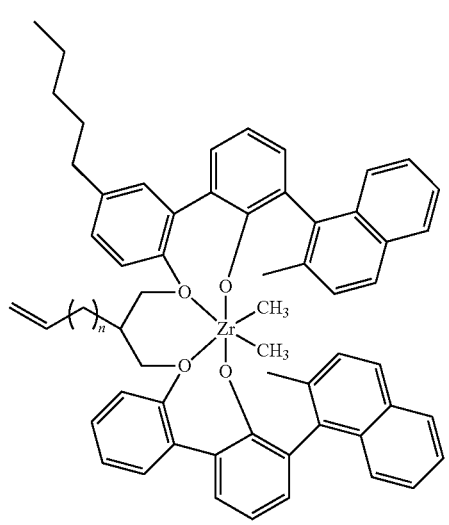
77

78
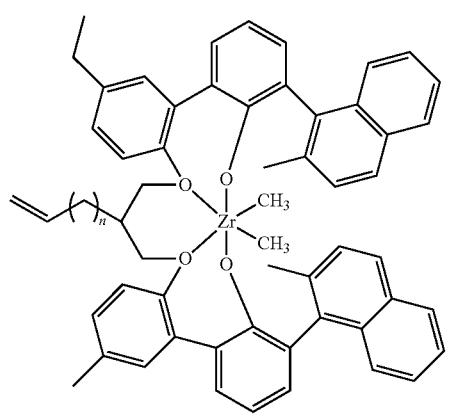
79
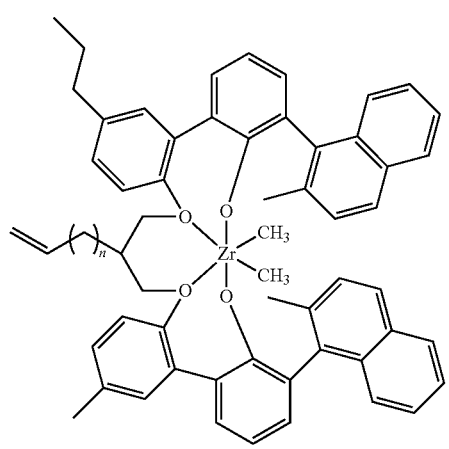
80
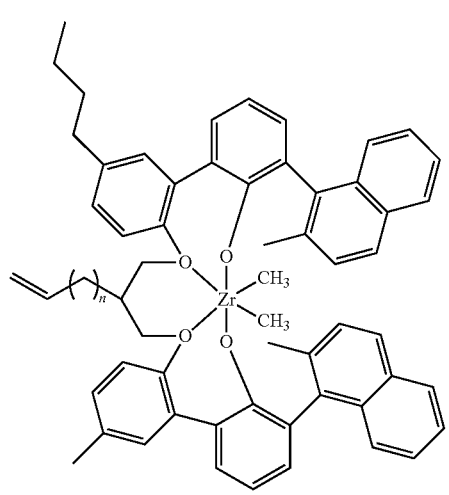
81
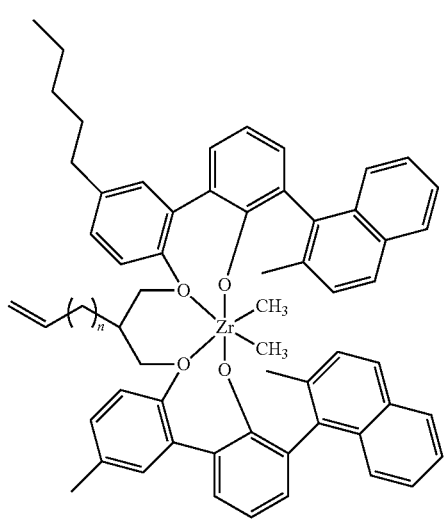
82
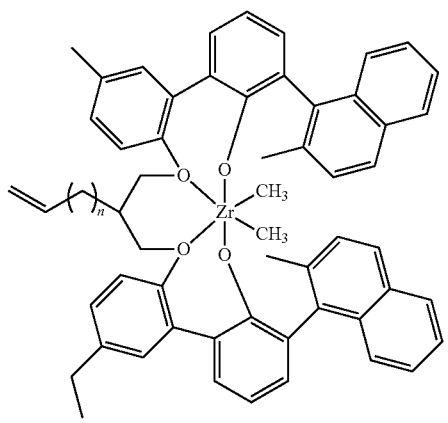
83
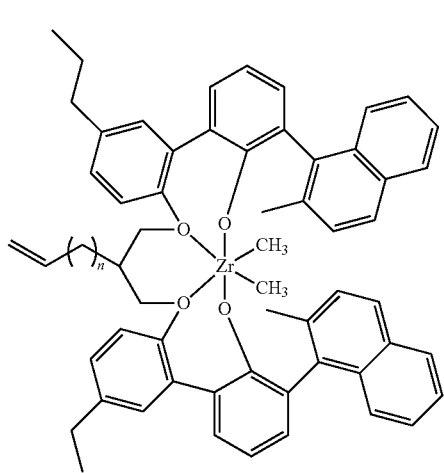

84
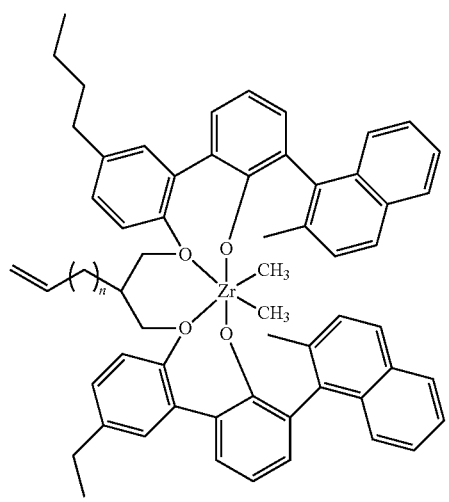
85
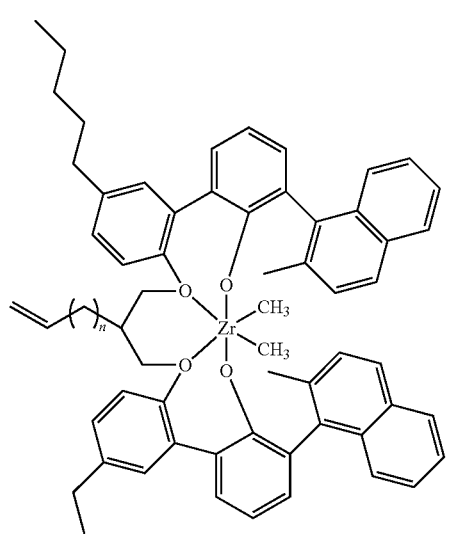
86
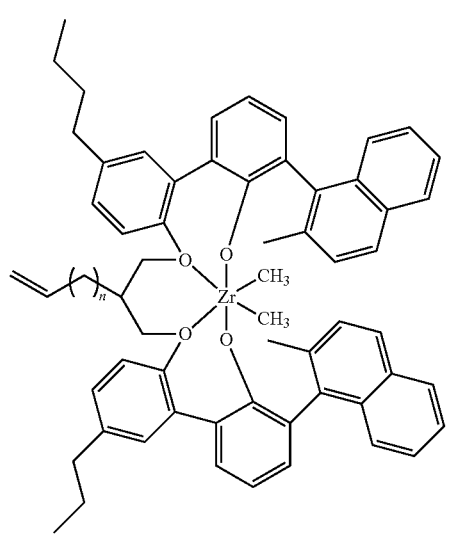
87
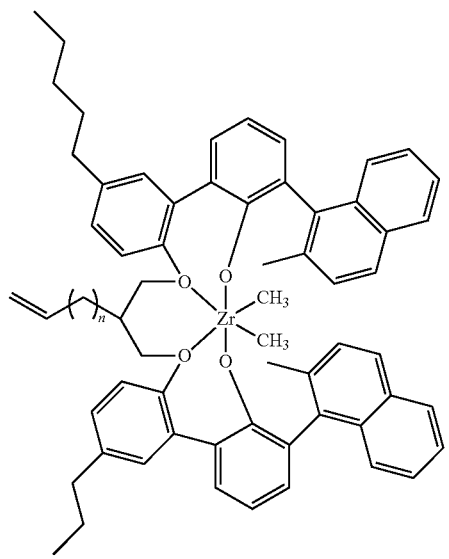
88
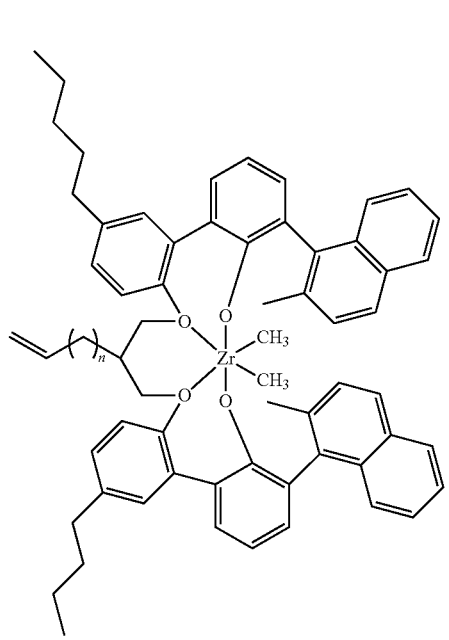
89
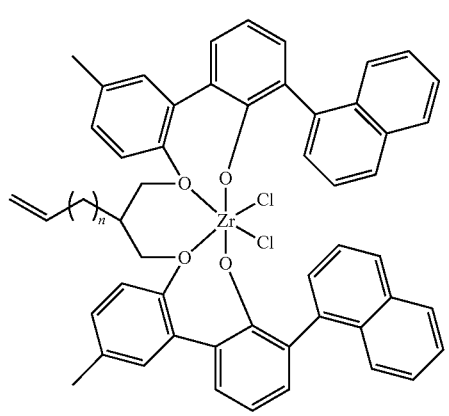

90
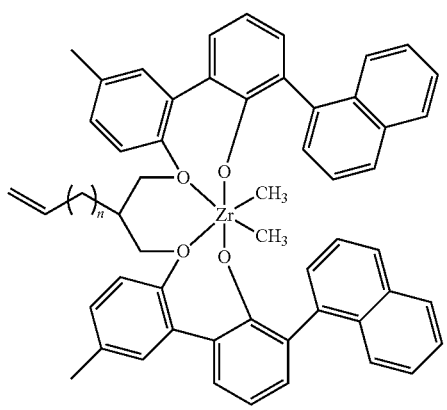
91
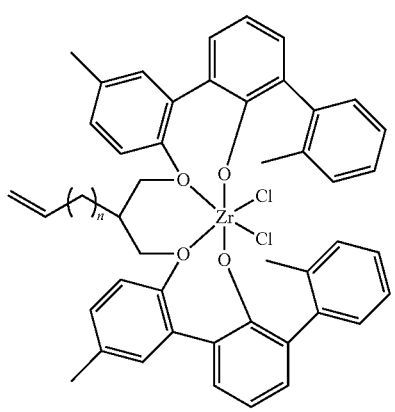
92
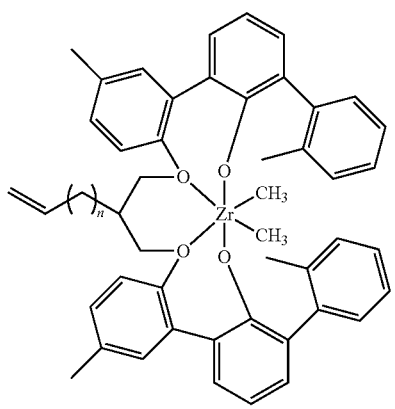
93
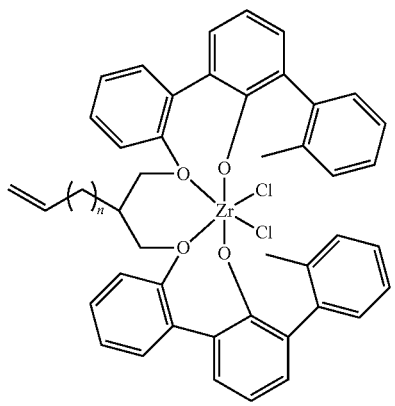
94
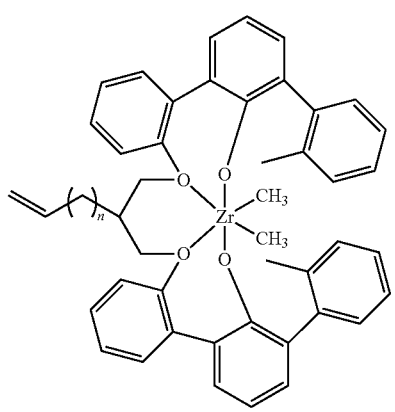
95
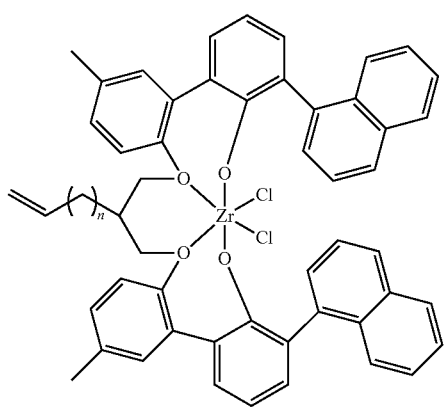
96
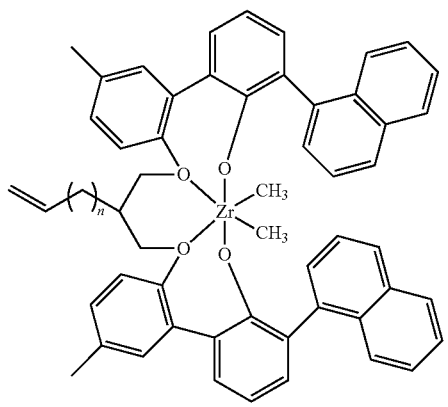
97
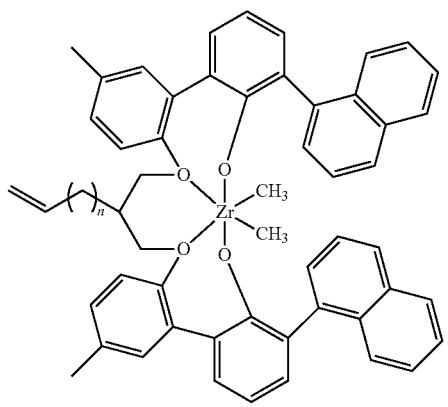

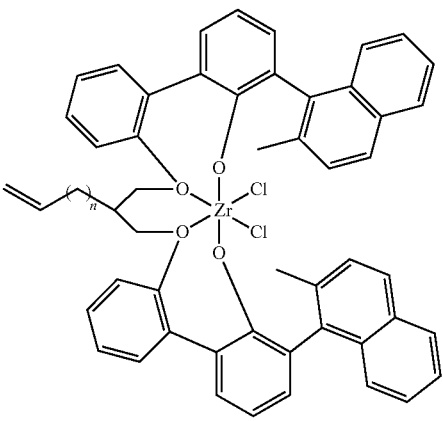
98
wherein n is an integer from 1 to 10. In at least one embodiment, n is 1.
In at least one embodiment, a catalyst compound represented by formula (I) or formula (II) is one or more of:
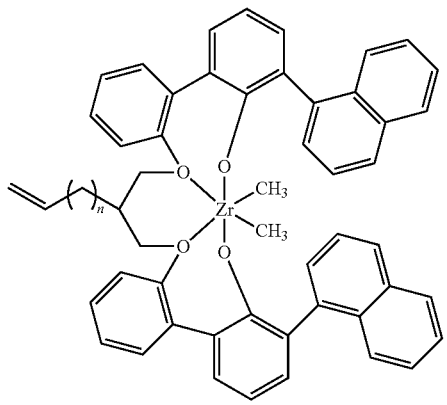
1
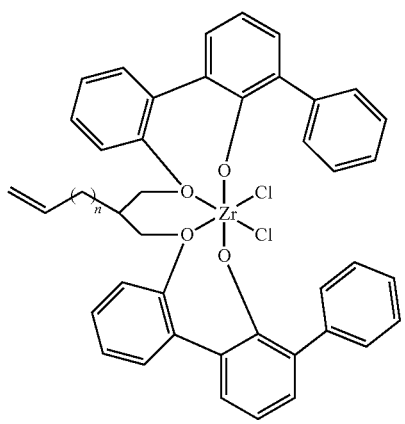
2
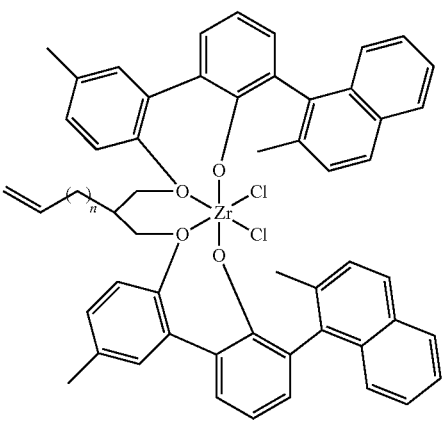
45
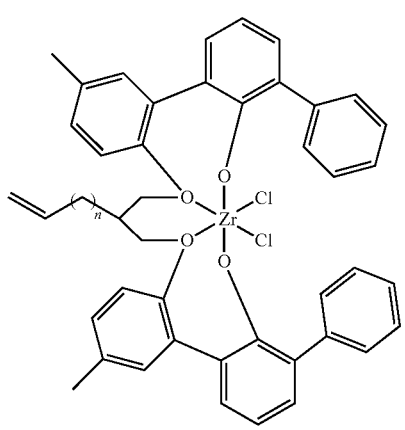
46
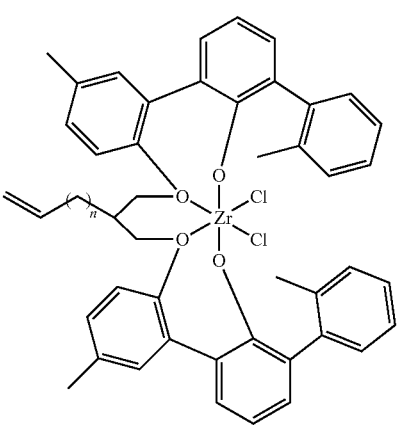
91

93

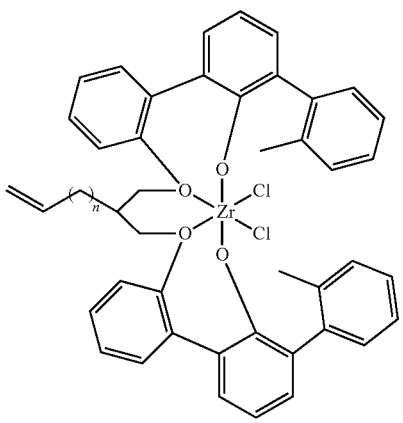

In at least one embodiment, one catalyst compound is used, e.g., the catalyst compounds are not different. For purposes of the present disclosure one metallocene catalyst compound is considered different from another if they differ by at least one atom. For example "bisindenyl ZrCl$_2$" is different from "(indenyl)(2-methylindenyl) ZrCl$_2$" which is different from "(indenyl)(2-methylindenyl) HfCl$_2$." Catalyst compounds that differ only by isomer are considered the same for purposes if the present disclosure, e.g., rac-dimethylsilylbis(2-methyl 4-phenyl)Hf(Me)$_2$ is considered to be the same as meso-dimethylsilylbis(2-methyl 4-phenyl)Hf (Me)$_2$.

In at least one embodiment, two or more different catalysts are present in a catalyst system used herein. For example, two or more different catalyst compounds are present in the reaction zone where the process(es) of the present disclosure are performed. Two or more different catalyst compounds include a first catalyst represented by formula (I) or (II) and a second catalyst represented by formula (I) or (II). Two or more different catalyst compounds also includes a first catalyst represented by formula (I) or (II) and a second catalyst that is a bridged or unbridged metallocene compound that preferably can have one or more Cp, iPrCp, Cp(Me)$_5$ rings, or mixtures thereof. When two transition metal based catalysts are used in one reactor as a mixed catalyst system, the two transition metal catalysts are preferably chosen such that the two are compatible. A simple screening method such as by $^1$H or $^{13}$C NMR, known to those of ordinary skill in the art, can be used to determine which catalysts are compatible. It is preferable to use the same activator for each of the catalysts, however, two different activators, such as a non-coordinating anion activator and an alumoxane, can be used in combination. If one or more catalysts contain an R$^1$ or R$^2$ ligand which is not a hydride, hydrocarbyl, or substituted hydrocarbyl, then the alumoxane is often contacted with the transition metal compounds prior to addition of the non-coordinating anion activator.

The catalyst compound represented by formula (I) or (II) and the second catalyst compound may be used in any ratio (A:B). The catalyst compound represented by formula (I) or (II) may be (A) if the second catalyst compound is (B). Alternatively, the catalyst compound represented by formula (I) or (II) may be (B) if the second catalyst compound is (A). Molar ratios of (A) to (B) can fall within the range of (A:B) about 1:1000 to about 1000:1, such as between about 1:100 and about 500:1, such as between about 1:10 and about 200:1, such as between about 1:1 and about 100:1, such as about 1:1 to about 75:1, such as about 5:1 to about 50:1. The ratio chosen will depend on the exact catalysts chosen, the method of activation, and the end product desired. In at least one embodiment, when using the two catalyst compounds, where both are activated with the same activator, useful mole percents, based upon the molecular weight of the catalyst compounds, are between about 10 to about 99.9% of (A) to about 0.1 and about 90% of (B), such as between about 25 and about 99% (A) to about 0.5 and about 50% (B), such as between about 50 and about 99% (A) to about 1 and about 25% (B), such as between about 75 and about 99% (A) to about 1 to about 10% (B).

In embodiments where the second catalyst compound is a bridged or unbridged metallocene compound, a metallocene catalyst compound can be an unbridged metallocene catalyst compound represented by the formula: Cp$^A$Cp$^B$M'X'$_n$, wherein each Cp$^A$ and Cp$^B$ is independently selected from the group consisting of cyclopentadienyl ligands, one or both Cp$^A$ and Cp$^B$ may contain heteroatoms, and one or both Cp$^A$ and Cp$^B$ may be substituted by one or more R" groups, wherein M' is selected from the group consisting of Groups 3 through 12 atoms and lanthanide Group atoms, wherein X' is an anionic leaving group, wherein n is 0 or an integer from 1 to 4, wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

In at least one embodiment, an unbridged metallocene catalyst compound is one or more of:
bis(n-propylcyclopentadienyl)hafnium dichloride; bis(n-propylcyclopentadienyl)hafnium dimethyl; bis(n-propylcyclopentadienyl)zirconium dichloride; bis(n-propylcyclopentadienyl)zirconium dimethyl; bis(n-propylcyclopentadienyl) titanium dichloride; bis(n-propylcyclopentadienyl)titanium dimethyl; (n-propylcyclopentadienyl, pentamethylcyclopentadienyl)zirconium dichloride; (n-propylcyclopentadienyl, pentamethylcyclopentadienyl)zirconium dimethyl; (n-propylcyclopentadienyl, pentamethylcyclopentadienyl)hafnium dichloride; (n-propylcyclopentadienyl, pentamethylcyclopentadienyl)hafnium dimethyl; (n-propylcyclopentadienyl, pentamethylcyclopentadienyl)titanium dichloride; (n-propylcyclopentadienyl, pentamethylcyclopentadienyl)titanium dimethyl; (n-propylcyclopentadienyl, tetramethylcyclopentadienyl)zirconium dichloride; (n-propylcyclopentadienyl, tetramethylcyclopentadienyl)zirconium dimethyl; (n-propylcyclopentadienyl, tetramethylcyclopentadienyl)hafnium dichloride; (n-propylcyclopentadienyl, tetramethylcyclopentadienyl)hafnium dimethyl; (n-propylcyclopentadienyl, tetramethylcyclopentadienyl)titanium dichloride; (n-propylcyclopentadienyl, tetramethylcyclopentadienyl)titanium dimethyl; bis(cyclopentadienyl)zirconium dichloride; bis (cyclopentadienyl)titanium dichloride; bis(cyclopentadienyl)hafnium dichloride; bis(cyclopentadienyl)zirconium dimethyl; bis(cyclopentadienyl)titanium dimethyl; bis(cyclopentadienyl)hafnium dimethyl; bis(n-butylcyclopentadienyl)hafnium dichloride; bis(n-butylcyclopentadienyl)hafnium dimethyl; bis(n-butylcyclopentadienyl)zirconium dichloride; bis(n-butylcyclopentadienyl)zirconium dimethyl; bis(n-butylcyclopentadienyl)titanium dichloride; bis (n-butylcyclopentadienyl)titanium dimethyl; bis(pentamethylcyclopentadienyl)hafnium dichloride; bis(pentamethylcyclopentadienyl)hafnium dimethyl; bis(pentamethylcyclopentadienyl)zirconium dichloride; bis(pentamethylcyclopentadienyl)zirconium dimethyl; bis(pentamethylcyclopentadienyl)titanium dichloride; bis(pentamethylcyclopentadienyl)titanium dimethyl; bis(1-methyl-3-n-butylcyclopentadienyl)hafnium dichloride; bis(1-methyl-3-n-butylcyclopentadienyl)hafnium dimethyl; bis(1-methyl-3-n-butylcyclopentadienyl)zirconium dichloride; bis(1-methyl-3-n-butylcyclopentadienyl)zirconium dimethyl; bis(1-methyl-3-n-butylcyclopentadienyl)titanium dichloride; bis(1-methyl-3-n-butylcyclopentadienyl)titanium dimethyl and variations where the dimethyl above is replaced with diethyl, dibromide, dibenzyl, etc.

In embodiments where the second catalyst compound is a bridged or unbridged metallocene compound, a metallocene catalyst compound can be a bridged metallocene catalyst compound represented by the formula: $Cp^A(A)Cp^BM'X'_n$, wherein each $Cp^A$ and $Cp^B$ is independently selected from the group consisting of cyclopentadienyl ligands, one or both $Cp^A$ and $Cp^B$ may contain heteroatoms, and one or both $Cp^A$ and $Cp^B$ may be substituted by one or more R'' groups, wherein M' is selected from the group consisting of Groups 3 through 12 atoms and lanthanide Group atoms, wherein X' is an anionic leaving group, wherein n is 0 or an integer from 1 to 4, wherein (A) is selected from the group consisting of divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkyl thio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; wherein R'' is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

Methods to Prepare the Catalyst Compounds

All air sensitive syntheses are carried out in nitrogen purged dry boxes. All solvents are available from commercial sources. 2-Bromo-4-methylphenol, benzyl bromide, diethyl malonate, zinc chloride, sodium hydride, tetrahydrofuran, lithium aluminum hydride, hydrogen, palladium on carbon, hydrochloric acid, and diisopropyl azodicarboxylate (DIAD) are available from commercial sources. Aluminum alkyls are available as hydrocarbon solutions from commercial sources. Methylalumoxane ("MAO") is available from Albemarle as a 30 wt % solution in toluene.

Generally, catalysts of Formula (I) and Formula (II) can be synthesized according to the schematic reaction procedure described in Schemes 1A, 1B, and 2. As shown in Scheme 1A: (i) 2-bromo-4-methylphenol is treated with benzyl bromide to form 1-(benzyloxy)-2-bromo-4-methylbenzene; (ii) 1-(benzyloxy)-2-bromo-4-methylbenzene is treated with an aryl lithium salt in the presence of zinc chloride and Pd(PPh₃)₂ to form the triaryl product; (iii) the triaryl product can undergo debenzylation in the presence of hydrogen and palladium/carbon to form 2'-(methoxymethoxy)-5-methyl-[1,1':3',1''-terphenyl]-2-ol.

As shown in Scheme 1B, (i) diethyl malonate is reacted with 4-bromobut-1-ene in the presence of sodium hydride in tetrahydrofuran solvent to form diethyl 2-(but-3-en-1-yl)malonate; (ii) diethyl 2-(but-3-en-1-yl)malonate is treated with lithium aluminum hydride to form the reduction product 2-(but-3-en-1-yl)propane-1,3-diol. The reduction product 2-(but-3-en-1-yl)propane-1,3-diol (of Scheme 1B) is reacted with the 2'-(methoxymethoxy)-5-methyl-[1,1':3',1''-terphenyl]-2-ol product (of Scheme 1A) in the presence of DIAD and PPh₃ to form compound 1 (6,6'''-((2-(but-3-en-1-yl)propane-1,3-diyl)bis(oxy))bis(2'-(methoxymethoxy)-3-methyl-1,1':3',1''-terphenyl)).

The final products are obtained by recrystallization of the crude solids.

Scheme 1

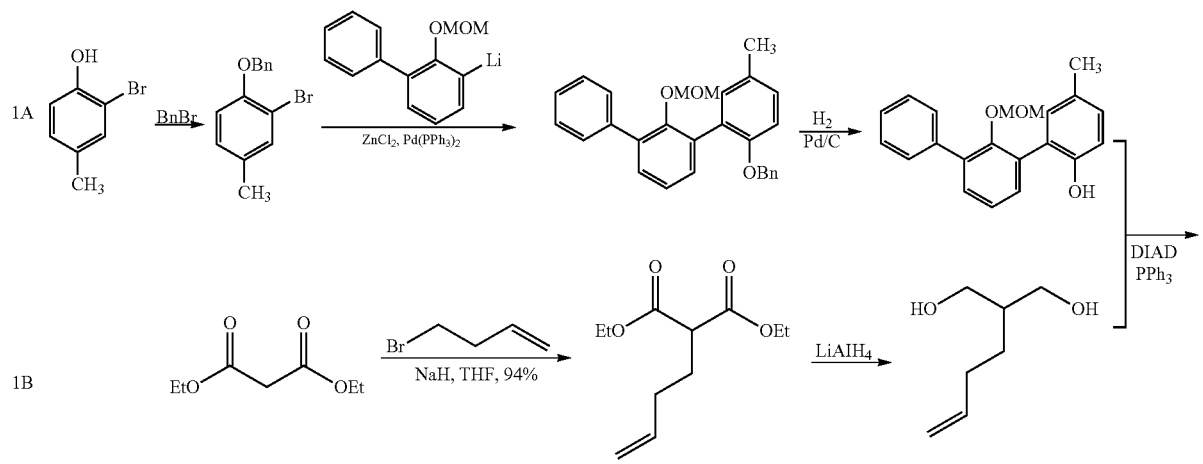

-continued

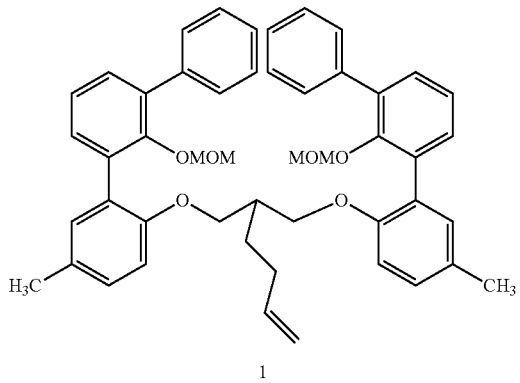

1

As shown in Scheme 2, (i) compound 1 is deprotected (removal of aryl alcohol protecting groups) in the presence of HCl; (ii) followed by treatment with $ZrBn_2Cl_2$ to form the catalyst product (Catalyst Compound 2).

Scheme 2

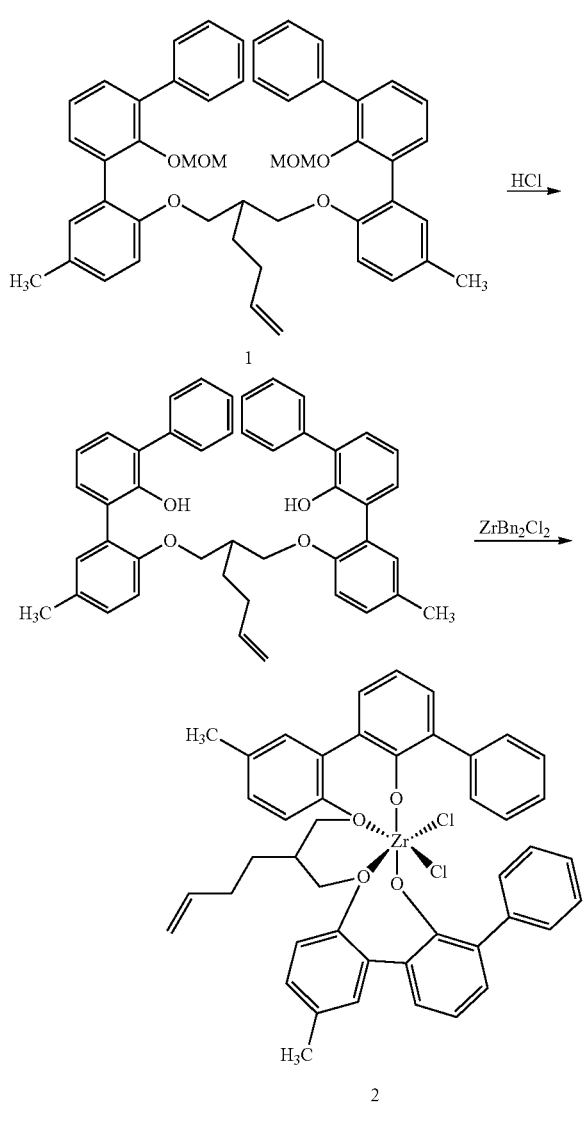

Activators

After the catalysts have been synthesized, catalyst systems may be formed by combining the catalysts with activators in any suitable manner, including by supporting them for use in slurry or gas phase polymerization. The catalyst systems may also be added to or generated in solution polymerization or bulk polymerization (in the monomer, i.e., no solvent). The catalyst system typically comprises a transition metal complex as described above and an activator such as alumoxane or a non-coordinating anion activator. Activation may be performed using alumoxane solution including an alkylalumoxane such as methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. The catalyst system employed in the present disclosure can use an activator selected from alumoxanes, such as methyl alumoxane, modified methyl alumoxane, ethyl alumoxane, iso-butyl alumoxane, TEAL (triethyl aluminum), and the like.

When an alumoxane or modified alumoxane is used, the catalyst-to-activator molar ratio is from about 1:3000 to about 10:1; such as about 1:2000 to about 10:1; such as about 1:1000 to about 10:1; such as about 1:500 to about 1:1; such as about 1:300 to about 1:1; such as about 1:200 to about 1:1; such as about 1:100 to about 1:1; such as about 1:50 to about 1:1; such as about 1:10 to about 1:1. When the activator is an alumoxane (modified or unmodified), some embodiments select the maximum amount of activator at a 5000-fold molar excess over the catalyst (per metal catalytic site). The minimum activator-to-catalyst ratio can be 1:1 molar ratio.

Activation may also be performed using non-coordinating anions, referred to as NCA's, of the type, for example, described in EP 277 003 A1 and EP 277 004 A1. NCA may be added in the form of an ion pair using, for example, [DMAH]+[NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., $[PhNMe_2H]B(C_6F_5)_4$) and N,N-dimethylanilinium tetrakis (heptafluoronaphthyl)borate, where Ph is phenyl, and Me is methyl.

Additionally activators useful herein include those described in U.S. Pat. No. 7,247,687 at column 169, line 50 to column 174, line 43, particularly column 172, line 24 to column 173, line 53.

In an embodiment of the present disclosure described herein, the non-coordinating anion activator is represented by the following formula (1):

$$(Z)^{d+}(A^{d-}) \tag{1}$$

wherein Z is (L-H) or a reducible Lewis acid, L is a neutral Lewis base, H is hydrogen and $(L-H)^+$ is a Bronsted acid; $A^{d-}$ is a non-coordinating anion having the charge d−; and d is an integer from 1 to 3.

When Z is (L-H) such that the cation component is $(L-H)^{d+}$, the cation component may include Bronsted acids such as protonated Lewis bases capable of protonating a moiety, such as an alkyl or aryl, from the catalyst precursor, resulting in a cationic transition metal species, or the activating cation $(L-H)^{d+}$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C+)$, where Ar is aryl or aryl substituted with a heteroatom, or a $C_1$ to $C_{40}$ hydrocarbyl, the reducible Lewis acid may be represented by the formula: $(Ph_3C+)$, where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, the Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad-components also include diboron compounds as disclosed in U.S. Pat. No. 5,447,895, which is fully incorporated herein by reference.

In an embodiment in any of the NCA's represented by Formula 1 described above, the anion component Ad− is represented by the formula [M*k*+Q*n*]d*− wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, the Q* having up to 20 carbon atoms with the proviso that in not more than 1 occurrence is Q* a halogen.

The present disclosure also provides a method to polymerize olefins comprising contacting olefins (such as propylene) with a catalyst complex as described above and an NCA activator represented by the Formula (2):

$$R_nM^{**}(ArNHal)^{4-n} \tag{2}$$

where R is a monoanionic ligand; $M^{**}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Zd+ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: $(Ar_3C+)$, where Ar is aryl or aryl substituted with a heteroatom, and/or a $C_1$ to $C_{40}$ hydrocarbyl, or the reducible Lewis acid represented by the formula: $(Ph_3C+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)^{d+}$, wherein L is an neutral Lewis base; H is hydrogen; (L-H) is a Bronsted acid; and d is 1, 2, or 3, or $(L-H)^{d+}$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \tag{3}$$

wherein $OX^{e+}$ is a cationic oxidizing agent having a charge of e+; e is 1, 2 or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of Ad− include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In at least one embodiment, an activator is one or more of: N,N-dimethylanilinium tetra(perfluorophenyl)borate; N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl) borate; triphenylcarbenium tetrakis(perfluoronaphthyl) borate; triphenylcarbenium tetrakis(perfluorobiphenyl) borate; triphenylcarbenium tetrakis(3,5-bis(trifluoromethyl) phenyl)borate; triphenylcarbenium tetra(perfluorophenyl) borate; trimethylammonium tetrakis(perfluoronaphthyl) borate; triethylammonium tetrakis(perfluoronaphthyl) borate; tripropylammonium tetrakis(perfluoronaphthyl) borate; tri(n-butyl)ammonium tetrakis(perfluoronaphthyl) borate; tri(t-butyl)ammonium tetrakis(perfluoronaphthyl) borate; N,N-diethylanilinium tetrakis(perfluoronaphthyl) borate; N,N-dimethyl-(2,4,6-trimethylanilinium) tetrakis (perfluoronaphthyl)borate; and tropillium tetrakis (perfluoronaphthyl)borate.

In at least one embodiment, two NCA activators may be used in the polymerization and the molar ratio of the first NCA activator to the second NCA activator can be any ratio. In at least one embodiment, the molar ratio of the first NCA activator to the second NCA activator is 0.01:1 to 10,000:1, or 0.1:1 to 1000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1000:1. In at least one embodiment, the NCA activator-to-catalyst ratio is 0.5:1 to 10:1, or 1:1 to 5:1.

In at least one embodiment, the catalyst compounds can be combined with combinations of alumoxanes and NCA's (see for example, U.S. Pat. Nos. 5,153,157 and 5,453,410; EP 0 573 120 BI, WO 94/07928, and WO 95/14044 which discuss the use of an alumoxane in combination with an ionizing activator, all of which are incorporated by reference herein).

In at least one embodiment, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Support Materials

In embodiments herein, the catalyst system may comprise an inert support material. In at least one embodiment, the supported material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from about 10 to about 700 $m^2/g$, pore volume in the range of from about 0.1 to about 4.0 cc/g and average particle size in the range of from about 5 to about 500 m. In at least one embodiment, the surface area of the support material is in the range of from about 50 to about 500 $m^2/g$, pore volume of from about 0.5 to about 3.5 cc/g and average particle size of from about 10 to about 200 m. In at least one embodiment, the surface area of the support material is in the range is from about 100 to about 400 $m^2/g$, pore volume from about 0.8 to about 3.0 cc/g and average particle size is from about 5 to about 100 m. The average pore size of the support material useful in the present disclosure is in the range of from 10 to 1000 Å, such as 50 to about 500 Å, such as 75 to about 350 Å. In some embodiments, the support material is a high surface area, amorphous silica (surface area=300 $m^2/gm$; pore volume of 1.65 $cm^3/gm$). Silicas are marketed under the tradenames of Davison 952 or Davison 955 by the Davison Chemical Division of W.R. Grace and Company. In other embodiments DAVISON 948 is used.

The support material should be dry, that is, substantially free of absorbed water. Drying of the support material can be effected by heating or calcining at about 100° C. to about 1000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of the present disclosure. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In at least one embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the catalyst, activator and support is heated to about 0° C. to about 70° C., such as to about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

In embodiments herein, the present disclosure provides polymerization processes where monomer (such as propylene or ethylene), and optionally comonomer, are contacted with a catalyst system comprising an activator and at least one metallocene compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator may be an alumoxane or a non-coordination anion activator. The one or more olefin monomers may be propylene and/or ethylene and the polymerization process further comprises heating the one or more olefin monomers and the catalyst system to 70° C. or more to form polypropylene or polyethylene, preferably polyethylene.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises ethylene and an optional comonomers comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 to 1.0 wt %, such as 0.002 to 0.5 25%, such as 0.003 to 0.2 25%, based upon the total weight of the composition. In some embodiments 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diolefin monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (i.e. di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. (A useful homogeneous polymerization process is one where at least 90 wt % of the product is soluble in the reaction media.) A bulk homogeneous process can be used. (A preferred bulk process is one where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. The polymerization can be performed in a bulk process.

Polymerizations can be performed at any temperature and/or pressure suitable to obtain the desired polymers, such as ethylene and or propylene polymers. Typical temperatures and/or pressures include a temperature in the range of from about 0° C. to about 300° C., such as about 20° C. to about 200° C., such as about 35° C. to about 150° C., such as about 40° C. to about 120° C., such as about 45° C. to about 80° C., for example about 74° C., and at a pressure in the range of from about 0.35 MPa to about 10 MPa, such as about 0.45 MPa to about 6 MPa, such as about 0.5 MPa to about 4 MPa.

In a typical polymerization, the run time of the reaction is up to 300 minutes, such as in the range of from about 5 to 250 minutes, such as about 10 to 120 minutes.

In at least one embodiment, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the productivity of a catalyst of the present disclosure is from about 1,000 $gPgcat^{-1} hr^{-1}$ to about 20,000 $gPgcat^{-1} hr^{-1}$, such as from about 2,000 $gPgcat^{-1} hr^{-1}$ to about 15,000 $gPgcat^{-1} hr^{-1}$, such as from about 4,000 $gPgcat^{-1} hr^{-1}$ to about 14,000 $gPgcat^{-1}hr^{-1}$, such as from about 6,000 $gPgcat^{-1}hr^{-1}$ to about 13,000 $gPgcat^{-1} hr^{-1}$, such as from about 8,000 $gPgcat^{-1}hr^{-1}$ to about 12,000 $gPgcat^{-1} hr^{-1}$. In at least one embodiment, the activity of the catalyst is from about 50 g/mmol/hour to about 40,000 g/mmol/hr, such as from about 500 g/mmol/hr to about 20,000 g/mmol/hr, such as from about 5,000 g/mmol/hr to about 15,000 g/mmol/hr, such as about 10,000 g/mmol/hr or more, such as 11,000 g/mmol/hr or more. In at least one embodiment, the conversion of olefin monomer is at least 10%, based upon polymer yield and the weight of the monomer entering the reaction zone, such as 20% or more, such as 30% or more, such as 50% or more, such as 80% or more. In at least one embodiment, a catalyst of the present disclosure has an activity of 150,000 to about 320,000 g/mmol/hour. In at least one embodiment, a catalyst of the present disclosure is capable of producing polyethylene having an Mw from about 40,000 to about 1,500,000 g/mol, such as from about 300,000 to about 1,000,000 g/mol, such as from about 600,000 to about 1,000,000 g/mol, such as from about 400,000 to about 900,000 g/mol, such as from about 500,000 to about 900,000 g/mol. In at least one embodiment, a catalyst of the present disclosure is capable of producing polyethylene having an Mn from about 30,000 to about 1,000,000 g/mol, such as from about 100,000 to about 500,000 g/mol, such as from about 100,000 to about 300,000 g/mol, such as from about 150,000 to about 300,000 g/mol. In at least one embodiment, a catalyst of the present disclosure is capable of producing polyethylene having an Mw/Mn value from about 1 to about 5, such as from about 1.5 to about 4, such as from about 2 to about 4, such as from about 2.5 to about 3.5.

In at least one embodiment, for catalyst systems of the present disclosure comprising a catalyst of formula (I) or formula (II) and one or more metallocene catalysts, as described above, a polyethylene formed by the catalyst system can have an Mw/Mn value from about 1 to about 5, such as from about 1.5 to about 4, such as from about 2 to about 4, such as from about 2.5 to about 3.5.

In at least one embodiment, little or no alumoxane is used in the process to produce the polymers. Alumoxane can be present at zero mol %, alternatively the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 70 to 110° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 80,000 g/mmol/hr (such as at least 150,000 g/mmol/hr, such as at least 200,000 g/mmol/hr, such as at least 250,000 g/mmol/hr, such as at least 300,000 g/mmol/hr). In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also provides compositions of matter which can be produced by the methods described herein.

In at least one embodiment, the process described herein produces ethylene homopolymers or ethylene copolymers, such as propylene-ethylene and/or ethylene-alphaolefin (such as $C_4$ to $C_{20}$) copolymers (such as ethylene-hexene copolymers or ethylene-octene copolymers) having an Mw/Mn of greater than 1 to 4 (such as greater than 1 to 3).

Likewise, the process of the present disclosure produces olefin polymers, such as polyethylene and polypropylene homopolymers and copolymers. In at least one embodiment, the polymers produced herein are homopolymers of ethylene or propylene, are copolymers of ethylene such as copolymer of ethylene having from 0 to 25 mol % (such as from 0.5 to 20 mol %, such as from 1 to 15 mol %, such as from 3 to 10 mol %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 to 25 mol % (such as from 0.5 to 20 mol %, such as from 1 to 15 mol %, such as from 3 to 10 mol %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, the monomer is ethylene and the comonomer is hexene, such as from 1 to 15 mol % hexene, such as 1 to 10 mol %.

In at least one embodiment, a polymer, such as polyethylene, has an Mw from about 40,000 to about 1,500,000 g/mol, such as from about 300,000 to about 1,000,000 g/mol, such as from about 600,000 to about 1,000,000 g/mol, such as from about 400,000 to about 900,000 g/mol, such as from about 500,000 to about 900,000 g/mol. In at least one embodiment, a polymer, such as polyethylene, has Mn from about 30,000 to about 1,000,000 g/mol, such as from about 100,000 to about 500,000 g/mol, such as from about 100,000 to about 300,000 g/mol, such as from about 150,000 to about 300,000 g/mol. In at least one embodiment, a polymer, such as polyethylene, has an Mw/Mn value from about 1 to about 5, such as from about 1.5 to about 4, such as from about 2 to about 4, such as from about 2.5 to about 3.5.

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, a bimodal polymer, such as a bimodal polyethylene (e.g., formed by a catalyst system having a catalyst represented by formula (I) or (II) and a metallocene catalyst) has an Mw/Mn value from about 1 to about 10, such as from about 1.5 to about 8, such as from about 2 to about 4, such as from about 2 to about 2.

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, LDPE, LLDPE, HDPE, random copolymer of ethylene and propylene, and/or butene, hexene, polybutene, ethylene vinyl acetate, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

EXPERIMENTAL $^1$H NMR for Metallocene Characterization:

Chemical structures are determined by $^1$H NMR. $^1$H NMR data are collected at room temperature (e.g., 23° C.) in a 5 mm probe using either a 400 or 500 MHz Bruker spectrometer with deuterated methylene chloride or deuterated benzene (in event of conflict, 500 MHz is used).

Examples

Synthesis of Catalysts (and Catalyst Precursor Compounds)

1-(benzyloxy)-2-bromo-4-methylbenzene 2-bromocresol (12.9 g, 68.9 mmol), benzyl bromide (9.0 mL, 75.8 mmol), potassium carbonate (28.5 g, 206 mmol), and TBAI (approx. 100 mg) were heated overnight at 65° C. in acetonitrile. Once cool, the mixture was filtered and concentrated under reduced pressure. The benzylated product was used without further purification.

2-(benzyloxy)-2'-(methoxymethoxy)-5-methyl-1,1': 3',1''-terphenyl

To (2-(methoxymethoxy)-[1,1'-biphenyl]-3-yl)lithium (4.0 g, 18.0 mmol) dissolved in 30 mL of THF was added zinc dichloride (2.7 g, 19.8 mmol). After 30 min, 1-(benzyloxy)-2-bromo-4-methylbenzene (5.0 g, 18.0 mmol) and palladium bis(tri-tert-butylphosphine) (184 mg, 0.36 mmol) were added and the mixture stirred at ambient temperature overnight. The reaction was quenched with water and extracted with 3 portions of ether. The combined organic layers were washed with water and brine, then dried (MgSO$_4$), filtered, and concentrated under reduced pressure. The crude residue was purified by column chromatography (10% aceton/isohexane) to give the product as a yellow oil in 83% yield: $^1$H NMR (400 MHz, CDCl$_3$, δ): 2.33 (s, 3H), 2.62 (s, 3H), 4.37 (s, 2H), 5.07 (s, 2H), 6.93 (d, J=8.4 Hz, 1H), 7.10 (m, 1H), 7.25 (m, 12H), 7.58 (d, J=6.8 Hz, 1H).

2'-(methoxymethoxy)-5-methyl-[1,1':3',1''-terphenyl]-2-ol

A solution of the above benzylphenol (6.1 g, 15.0 mmol) and 10% Pd/C in 40 mL THF/MeOH was stirred under and atmosphere of H$_2$ overnight. The mixture was filtered over celite and concentrated, then purified by silica gel column chromatography eluting with 10% acetone/isohexane: $^1$H NMR (400 MHz, CDCl$_3$, δ): 2.41 (s, 3H), 2.77 (s, 3H), 4.52 (s, 2H), 6.78 (s, 1H), 7.04 (d, J=8.0 Hz, 1H), 7.17 (m, 1H), 7.25 (m, 1H), 7.34 (m, 6H), 7.66 (d, J=6.8 Hz, 2H); $^{13}$C NMR (CDCl$_3$, δ): 21.2, 55.9, 116.6, 118.3, 124.8-132.8 (11C), 132.9, 138.4, 150.8, 151.2; IR (cm$^{-1}$): 3395, 2923, 1709, 1500, 1159, 927, 746, 700.

Diethyl 2-(but-3-en-1-yl)malonate

Sodium hydride (1.5 g, 95%, 62.4 mmol) was suspended in 150 mL of THF and cooled to −35° C. Diethyl malonate (10.0 g, 62.4 mmol) was added and the mixture warmed to ambient temperature over 30 min. Bromobutene (9.0 g, 56.7 mmol) was then added and the reaction heated at 60° C. for more than 24 h. It was then cooled and quenched with water, then extracted with 3 portions of ethyl acetate. The organic layers were washed with brine, dried (MgSO$_4$), filtered, and concentrated giving the product as a yellow oil in 94% yield which was carried on crude: $^1$H NMR (400 MHz, CDCl$_3$, δ): 1.23 (m, 6H), 1.96 (m, 4H), 3.32 (m, 1H), 4.15 (m, 4H), 4.98 (m, 2H), 5.73 (m, 1H); IR (cm$^{-1}$): 3079, 2982, 1734, 1448, 1227, 1154, 1033.

2-(But-3-en-1-yl)propane-1,3-diol

Lithium aluminum hydride (4.4 g, 115.6 mmol) was suspended in 285 mL of THF and cooled to −35° C. The above diester (diethyl 2-(but-3-en-1-yl)malonate) was added in portions and the mixture stirred overnight at ambient temperature. Water and 1 N NaOH were added and the emulsion extracted with ether then methylene chloride. Organic portions were washed with brine, dried (MgSO4), filtered, and concentrated giving the product as a pale yellow liquid in 55% yield: $^1$H NMR (400 MHz, CDCl$_3$, δ): 1.34 (m, 2H), 1.74 (m, 1H), 2.06 (m, 2H), 3.53 (br s, 2H), 3.63 (m, 2H), 3.75 (m, 2H), 4.96 (m, 2H), 5.78 (m, 1H).

6,6'''-((2-(but-3-en-1-yl)propane-1,3-diyl)bis(oxy)) bis(2'-(methoxymethoxy)-3-methyl-1,1':3',1''-terphenyl)

2-(But-3-en-1-yl)propane-1,3-diol (1.0 g, 7.6 mmol), triphenylphosphine (4.2 g, 16.7 mmol), and phenol 27035-29 (4.8 g, 15.2 mmol) were dissolved in 20 mL of THF. DIAD (3.2 mL, 16.7 mmol) was added drop wise and the reaction allowed to stir at ambient temperature overnight. The reaction was quenched with saturated ammonium chloride, then extracted with ethyl acetate. The organic layer was concentrated to a viscous oil, which was extracted with pentane. Upon concentration of pentane, the resulting oil was purified by column chromatography (10% acetone/isohexane): $^1$H NMR (400 MHz, CDCl$_3$, δ): 1.46 (m, 2H), 1.86 (m, 2H), 1.99 (m, 1H), 2.20 (s, 6H), 2.46 (s, 6H), 3.80 (m, 4H), 4.18 (s, 4H), 4.77 (m, 2H), 5.56 (m, 1H), 6.67 (d, J=8.4 Hz, 2H), 6.92 (m, 2H), 7.06 (m, 6H), 7.29 (m, 8H), 7.48 (m, 4H).

6,6'''-((2-(but-3-en-1-yl)propane-1,3-diyl)bis(oxy)) bis(3-methyl-[1,1':3',1''-terphenyl]-2'-ol)

To the above MOM protected phenolic compound dissolved in THF/MeOH was added approx. 1 mL concentrated HCl. The mixture was stirred overnight, then concentrated under reduced temperature and purified by column chromatography (20% acetone/isohexane): $^1$H NMR (400 MHz, CDCl$_3$, δ): 1.30 (m, 2H), 1.86 (m, 2H), 2.02 (m, 1H), 2.31 (m, 6H), 3.86 (m, 4H), 4.82 (m, 2H), 5.55 (m, 1H), 5.80 (s, 2H), 6.66 (d, J=8.4 Hz, 2H), 6.68 (m, 4H), 7.11 (m, 4H), 7.39 (m, 8H), 7.52 (m, 4H); IR (cm$^{-1}$): 3532, 3382, 3030, 2924, 1603, 1501, 1495, 1228, 758, 699.

Zr Catalyst (Catalyst Compound 2):

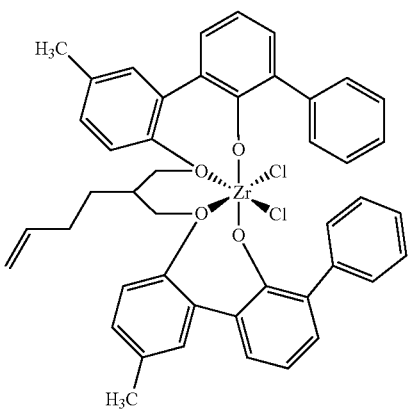

The above ligand (6,6'''-((2-(but-3-en-1-yl)propane-1,3-diyl)bis(oxy))bis(3-methyl-[1,1':3',1''-terphenyl]-2'-ol) (576 mg, 0.89 mmol) was dissolved in 10 mL of toluene and added to a solution of $ZrBn_2C_{12}$-$Et_2O$ in 10 mL of toluene. After 5 min, the mixture was heated to 85° C. and stirred for 1.5 h. It was then concentrated to half its original volume and the resulting white precipitate was isolated by filtration, then washed with pentane and dried under vacuum. Yield=0.45 g; the isolated complex contains about ⅔ equiv. of a toluene. The FIGURE is a $^1$H NMR spectrum of Catalyst Compound 2.

Formation of Supported Catalysts

SMAO is methylalumoxane supported on silica ES-70 (PQ Corporation, Conshohocken, Pa.) that has been calcined at 875° C. and prepared according to a procedure similar to the following: In a 4 L stirred vessel in a drybox methylalumoxane (MAO) (30 wt % in toluene) is added along with 2400 g of toluene. This solution is then stirred at 60 RPM for 5 minutes. ES-70 silica that has been calcined at 875° C. is then added to the vessel. This slurry is heated at 100° C. and stirred at 120 RPM for 3 hours. The temperature is then lowered and the mixture is allowed to cool to ambient temperature over 2 hours. The stirrer is then set to 8 RPM and placed under vacuum for 72 hours. After emptying the vessel and sieving the supported MAO, about 1000 grams are obtained.

Supportation on SMAO.

39.7 mg of the zirconium catalyst synthesized above was slurried in toluene (ca. 6 mL) and 1.14 g SMAO (6.5 mmol Al/g support) was added with stirring. After 20 min the solid was isolated by filtration, washed (2×5 mL) with pentane and dried under vacuum (ca. 20 min) to give a supported catalyst (Zr loading ca. 40 umol/g cat; Al/Zr is about 115).

A 2 L autoclave was heated to 110° C. and purged with $N_2$ for at least 30 minutes. It was then charged with dry NaCl (350 g; Fisher, S271-10 dehydrated at 180° C. and subjected to several pump/purge cycles and finally passed through a 16 mesh screen prior to use) and SMAO (5 g) at 105° C. and stirred for 30 minutes. The temperature was adjusted to 85° C. At a pressure of 2 psig $N_2$, dry, degassed 1-hexene was added to the reactor with a syringe then the reactor was charged with $N_2$ to a pressure of 20 psig. A mixture of $H_2$ and $N_2$ was flowed into reactor (10% $H_2$ in $N_2$) while stirring the bed. Precharges of $H_2$ and 1-hexene as well as flow ratios of each to ethylene are shown in Table. 1.

Thereafter, the catalysts indicated in Table 1 were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least two days.

Gel Permeation Chromatography—Tosoh EcoSEC High Temperature GPC System (GPC-Tosoh EcoSEC)

Mw, Mn, and Mw/Mn were determined by using a High Temperature Gel Permeation Chromatography (Tosoh Bioscience LLC), equipped with a differential refractive index detector (DRI). Three high temperature TSK gel column (Tosoh GMHHR-H(30)HT2) were used. The nominal flow rate was 1.0 mL/min, and the nominal injection volume was 300 μL. The various transfer lines, columns, and dual flow differential refractometer (the DRI detector) were contained in an oven maintained at 160° C. Solvent for the experiment was prepared by dissolving 1.2 grams of butylated hydroxytoluene as an antioxidant in 4 liters of Aldrich reagent grade 1, 2, 4 trichlorobenzene (TCB). The TCB mixture was then filtered through a 0.1 μm Teflon filter. The TCB was then degassed with an online degasser before entering the GPC instrument. Polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2.0 mg/mL, with lower concentrations being used for higher molecular weight samples. Flow rate in the apparatus was then increased to 1.0 mL/minute, and the DRI was allowed to stabilize for 2 hours before injecting the first sample. The molecular weight was determined by combining universal calibration relationship with the column calibration which was performed with a series of monodispersed polystyrene (PS) standards. The MW was calculated at each elution volume with the following equation:

$$\log M_X = \frac{\log(K_X / K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}$=0.67 and KPS=0.000175 while $a_x$ and $K_x$ are obtained from published literature. Specifically, a/K=0.695/0.000579 for polyethylene and 0.705/0.0002288 for polypropylene.

The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery was calculated from the ratio of the integrated area of the concentration chromatography over elution volume and the injection mass which was equal to the pre-determined concentration multiplied by injection loop volume.

All molecular weights are reported in g/mol unless otherwise noted.

Differential Scanning Calorimetry (DSC-Procedure-2). Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature (Tm) corresponding to 10° C./min heating rate is determined. In the event of conflict between the DSC Procedure-1 and DSC procedure-2, DSC procedure-2 is used.

The catalyst was supported onto SMAO and tested under both low and high density PE conditions. The runs were conducted in salt bed reactors at 85° C. with the precharges of H$_2$ and 1-hexene as shown in the table below. The catalyst is:

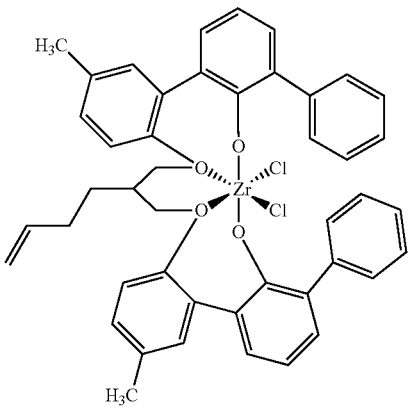

Polymerization parameters are reported in Table 1 below. Depending on polymerization conditions, productivity can be 11,596 gPE/gcat$^{-1}$hr$^{-1}$.

The GPC results show the olefinic BPP zirconium catalyst produces polyethylene with high molecular weight in a narrow distribution. For example, Mn values are 296,819 g/mol or 189,990 g/mol and Mw/Mn values of 2.89 or 3.52.

Overall, catalysts, catalyst systems, and methods of the present disclosure provide high polyolefin productivity and polyolefins, such as polyethylene, with high molecular weight and narrow molecular weight distribution. For example, catalysts having a homoallylic bridge (and/or naphthyl moieties) located at a certain position on the catalysts can provide catalyst productivity values of 10,000 gPgcat$^{-1}$ hr$^{-1}$ or greater and polyolefins, such as polyethylene, having an Mn of 100,000 (g/mol) or greater, Mw of 500,000 g/mol or greater, and an Mw/Mn value of about 1.5 to about 5.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

TABLE 1

| Run # | H2 Charge (mL) | H2/C2 Feed ratio | C6 Charge (mL) | C6/C2 ratio | Catalyst (mg) | Yield (g PE) | Productivity (gPE/gcat$^{-1}$hr$^{-1}$) |
|---|---|---|---|---|---|---|---|
| 1 | 600 | 1 | 0.5 | 0.02 | 16.9 | 46.8 | 2769 |
| 2 | 300 | 0.45 | 2.5 | 0.1 | 15.6 | 180.9 | 11596 |

| Run # | Mn (g/mol) | Mw (g/mol) | Mz (g/mol) | Mw/Mn | % Recovery | Methyls/1000C |
|---|---|---|---|---|---|---|
| 1 | 296819 | 858062 | 1899352 | 2.89 | 105 | 3.6 |
| 2 | 189990 | 668843 | 1885073 | 3.52 | 87 | 18.5 |

| Run # | Vinylenes/1000C | Trisub/1000C | Vinyls/1000C | Vinylidene/1000C |
|---|---|---|---|---|
| 1 | 0.03 | 0 | 0.03 | 0 |
| 2 | 0.09 | 0.13 | 0.08 | 0.01 |

What is claimed is:

1. A catalyst compound represented by Formula (I):

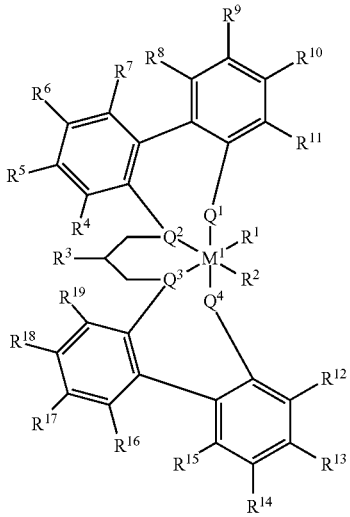

wherein:
M$^1$ is selected from the group consisting of titanium, zirconium, hafnium, vanadium, niobium, tantalum, chromium, molybdenum and tungsten;
each of Q$^1$, Q$^2$, Q$^3$, and Q$^4$ is independently oxygen or sulfur;
R$^1$ and R$^2$ are independently hydrogen, halogen, hydroxyl, hydrocarbyl, or substituted hydrocarbyl;
R$^3$ is a C$_2$-C$_{40}$ unsaturated alkyl or substituted C$_2$-C$_{40}$ unsaturated alkyl; and
each of R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, and R$^{19}$ is independently hydrogen, halogen, C$_1$-C$_{40}$ hydrocarbyl or C$_1$-C$_{40}$ substituted hydrocarbyl, —NR'$_2$, —SR', —OR, —OSiR'$_3$, —PR'$_2$, where each R' is hydrogen, halogen, C$_1$-C$_{10}$ alkyl, or C$_6$-C$_{10}$ aryl, or one or more of R$^4$ and R$^5$, R$^5$ and R$^6$, R$^6$ and R$^7$, R$^8$ and R$^9$, R$^9$ and R$^{10}$, R$^{10}$ and R$^{11}$, R$^{12}$ and R$^{13}$, R$^{13}$ and R$^{14}$, R$^{14}$ and R$^{15}$, R$^{16}$ and R$^{17}$, R$^{17}$ and R$^{18}$, and R$^{18}$ and R$^{19}$ are joined to form a saturated ring, unsaturated ring, substituted saturated ring, or substituted unsaturated ring.

2. The catalyst compound of claim 1, wherein M$^1$ is zirconium.

3. The catalyst compound of claim 1, wherein each of R$^1$ and R$^2$ is a halogen.

4. The catalyst compound of claim 1, wherein each of Q$^1$, Q$^2$, Q$^3$, and Q$^4$ is oxygen.

5. The catalyst compound of claim 1, wherein R$^3$ is a C$_1$-C$_{40}$ unsaturated alkyl comprising a vinyl moiety.

6. The catalyst compound of claim 1, wherein R$^3$ is 1-propenyl, 1-butenyl, 1-pentenyl, 1-hexenyl, 1-heptenyl, 1-octenyl, 1-nonenyl, or 1-decenyl.

7. The catalyst compound of claim 1, wherein at least one of R$^{11}$ and R$^{12}$ is substituted C$_6$-C$_{10}$ aryl.

8. The catalyst compound of claim 1, wherein each of R$^4$, R$^5$, R$^6$, R$^7$, R$^8$, R$^9$, R$^{10}$, R$^{13}$, R$^{14}$, R$^{15}$, R$^{16}$, R$^{17}$, R$^{18}$, and R$^{19}$ is independently hydrogen or C$_1$-C$_{40}$ hydrocarbyl.

9. The catalyst compound of claim 1, wherein each of R$^4$, R$^5$, R$^6$, R$^7$, R$^8$, R$^9$, R$^{10}$, R$^{13}$, R$^{14}$, R$^{15}$, R$^{16}$, R$^{18}$, and R$^{19}$ is independently selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

10. The catalyst compound of claim 1, wherein each of R$^6$ and R$^{17}$ is C$_1$-C$_{40}$ hydrocarbyl and R$^4$, R$^5$, R$^7$, R$^8$, R$^9$, R$^{10}$, R$^{13}$, R$^{14}$, R$^{15}$, R$^{16}$, R$^{18}$, and R$^{19}$ is hydrogen.

11. A catalyst compound represented by the formula (II):

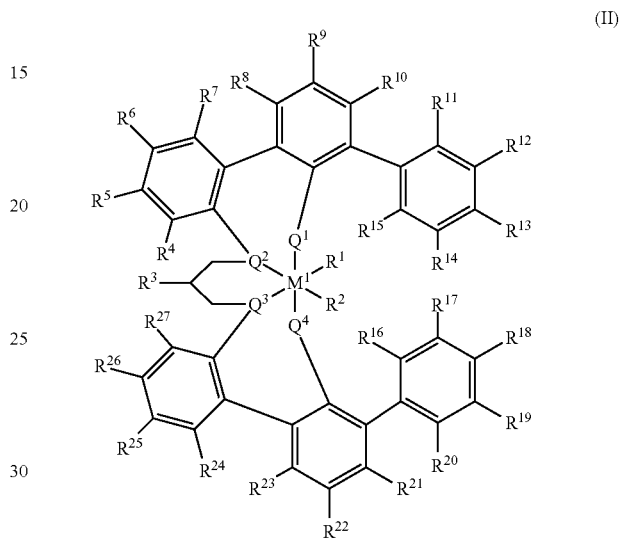

wherein:
M$^1$ is selected from the group consisting of titanium, zirconium, hafnium, vanadium, niobium, tantalum, chromium, molybdenum and tungsten;
each of Q$^1$, Q$^2$, Q$^3$, and Q$^4$ is independently oxygen or sulfur;
R$^1$ and R$^2$ are independently hydrogen, halogen, hydrocarbyl, or substituted hydrocarbyl;
R$^3$ is a C$_2$-C$_{40}$ unsaturated alkyl or substituted C$_2$-C$_{40}$ unsaturated alkyl; and
each of R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$ is independently hydrogen, halogen, C$_1$-C$_{40}$ hydrocarbyl or C$_1$-C$_{40}$ substituted hydrocarbyl, —NR'$_2$, —SR', —OR, —OSiR'$_3$, —PR'$_2$, where each R' is hydrogen, halogen, C$_1$-C$_{10}$ alkyl, or C$_6$-C$_{10}$ aryl, or one or more of R$^4$ and R$^5$, R$^5$ and R$^6$, R$^6$ and R$^7$, R$^8$ and R$^9$, R$^9$ and R$^{10}$, R$^{11}$ and R$^{12}$, R$^{12}$ and R$^{13}$, R$^{13}$ and R$^{14}$, R$^{14}$ and R$^{15}$, R$^{16}$ and R$^{17}$, R$^{17}$ and R$^{18}$, R$^{18}$ and R$^{19}$, R$^{19}$ and R$^{20}$, R$^{21}$ and R$^{22}$, R$^{22}$ and R$^{23}$, R$^{24}$ and R$^{25}$, R$^{25}$ and R$^{26}$, or R$^{26}$ and R$^{27}$ are joined to form a saturated ring, unsaturated ring, substituted saturated ring, or substituted unsaturated ring.

12. The catalyst compound of claim 11, wherein each of R$^6$ and R$^{25}$ is C$_1$-C$_{40}$ hydrocarbyl and each of R$^4$, R$^5$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{26}$, R$^{27}$ is hydrogen.

13. The catalyst compound of claim 11, wherein the catalyst compound comprises one or more of:

1
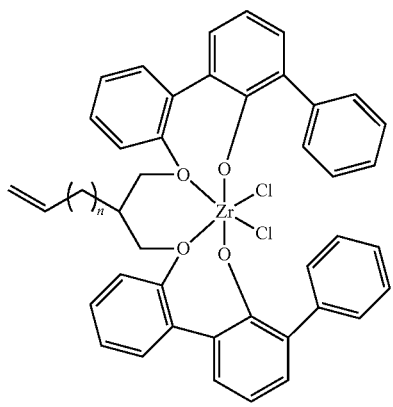
2
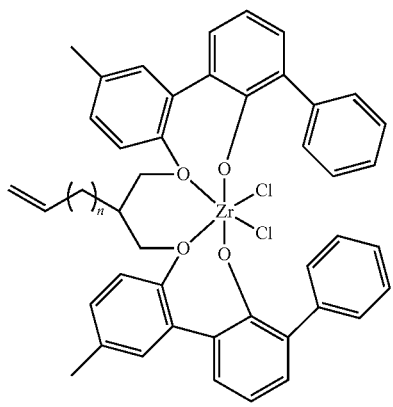
3
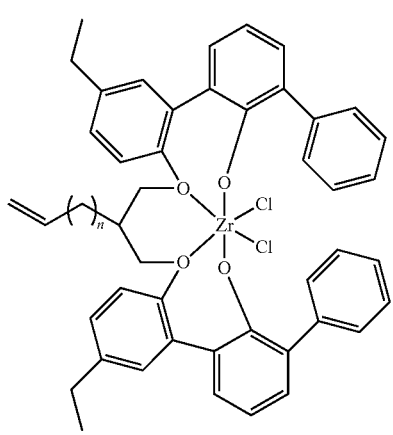
4
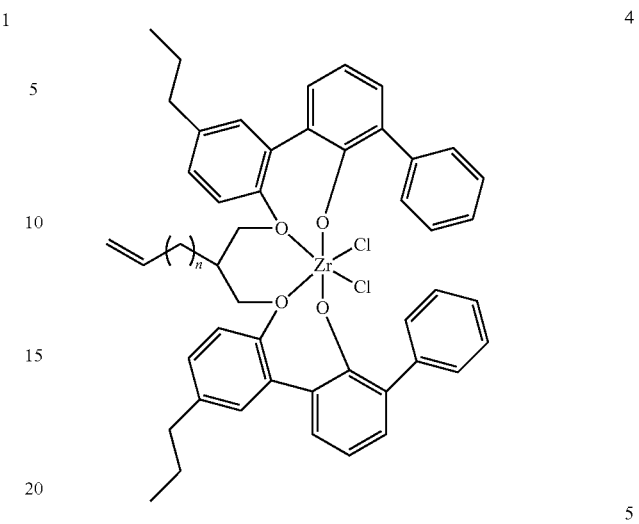
5
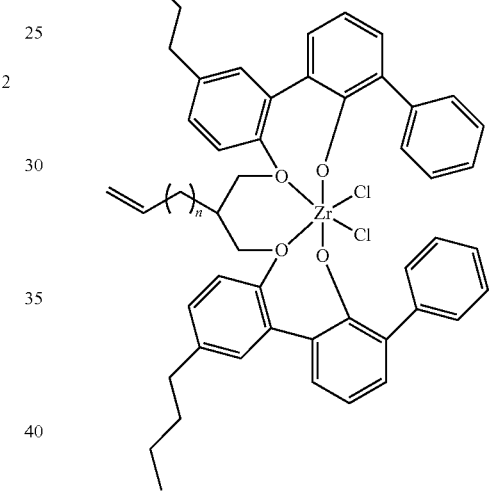
6
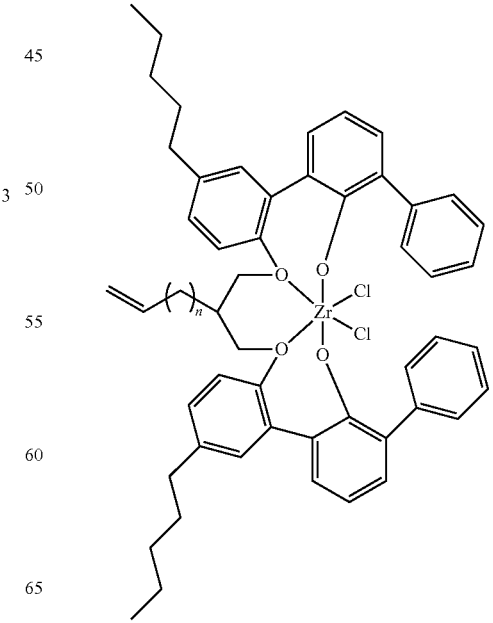

-continued
7
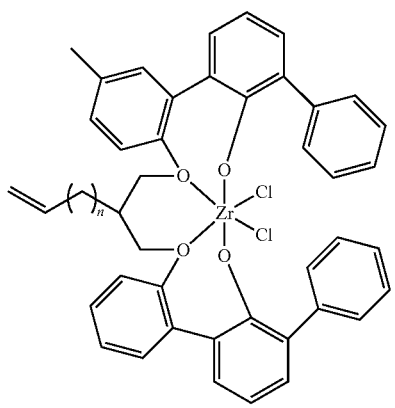
8
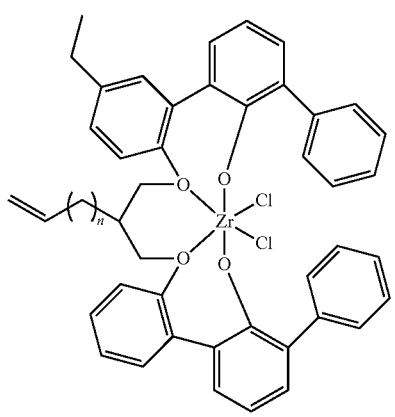
9
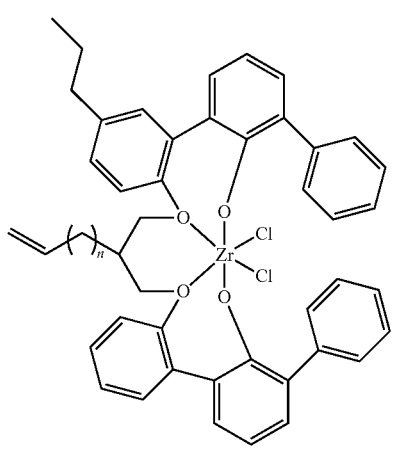
-continued
10
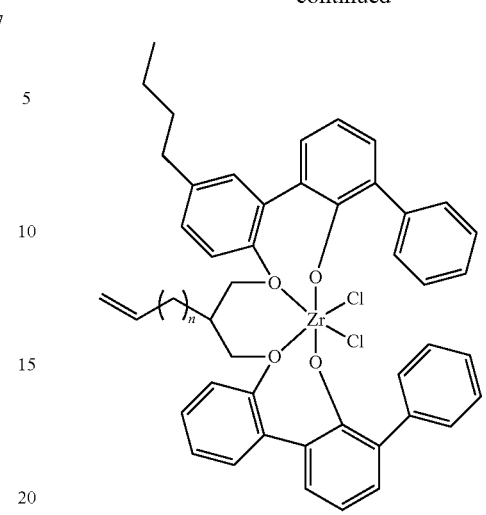
11
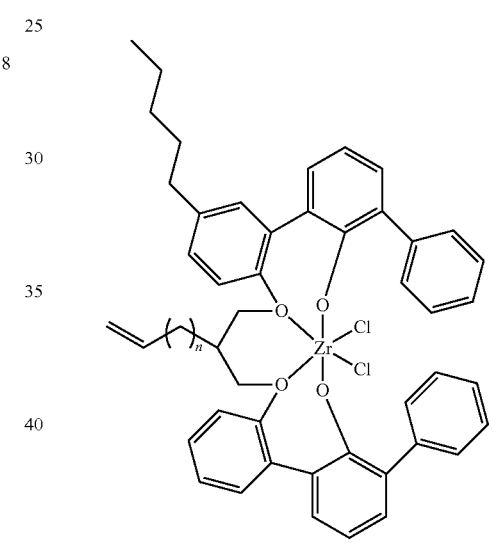
12
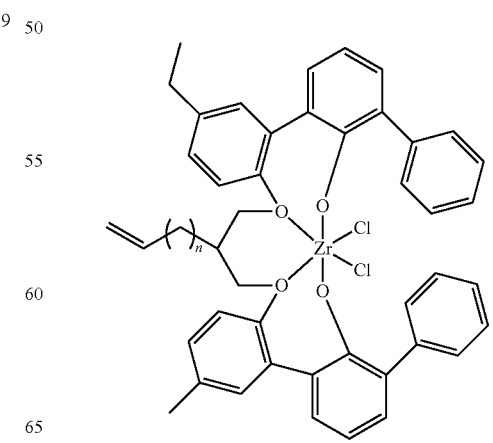

13
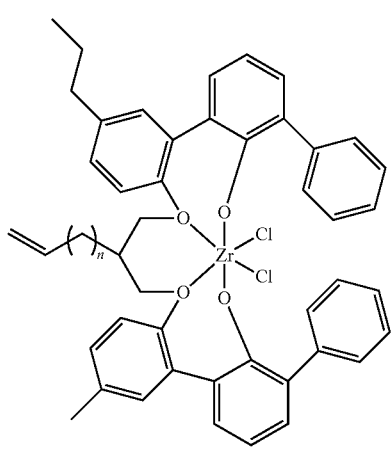
14
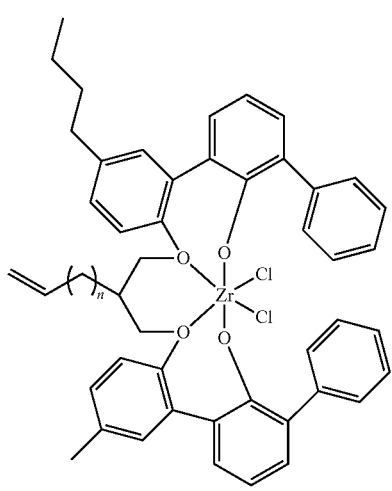
15
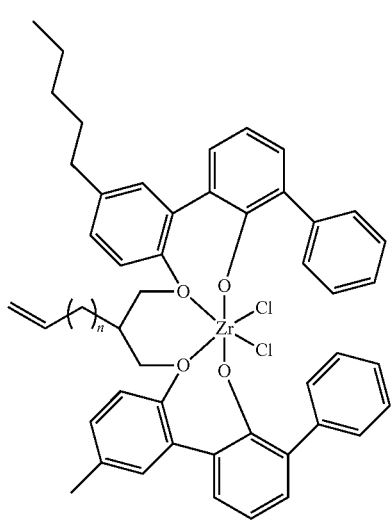
16
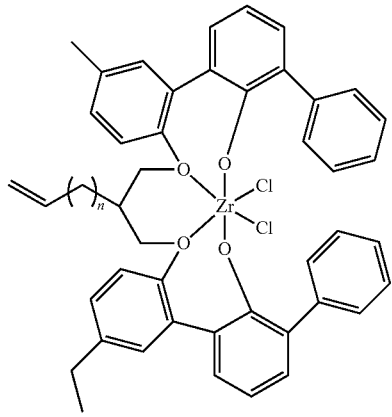
17
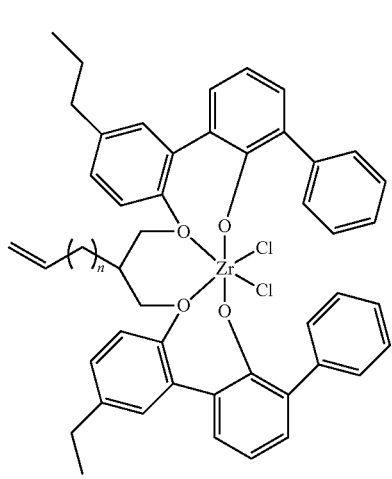
18
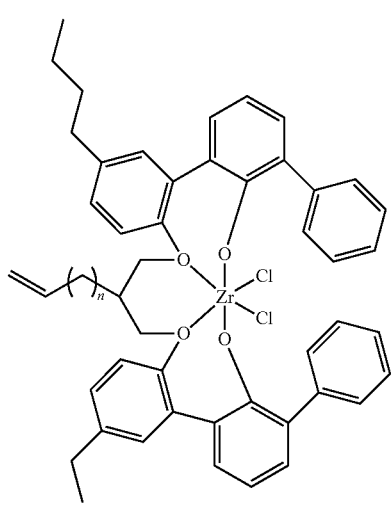

-continued
19
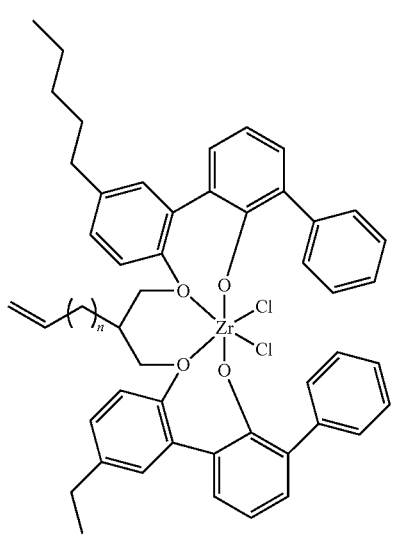
20
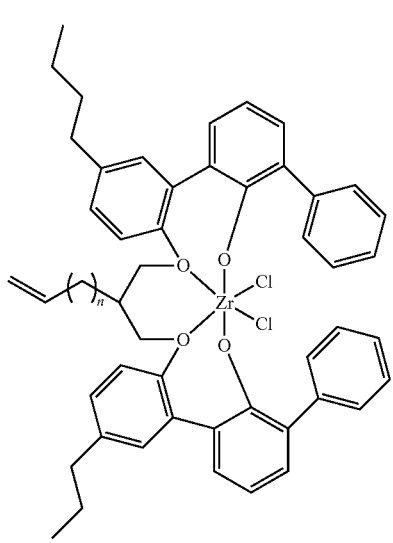
21
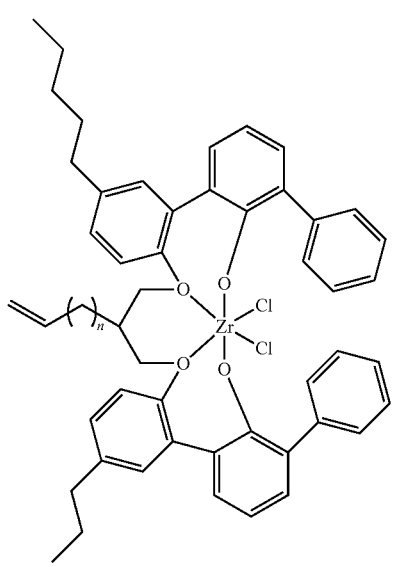
-continued
22
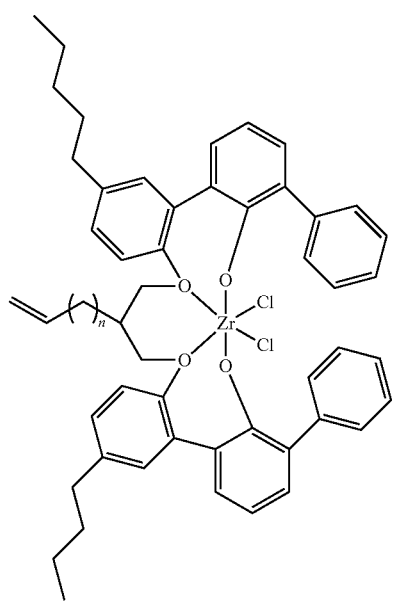
23
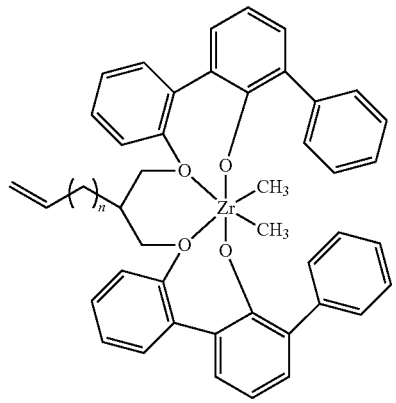
24
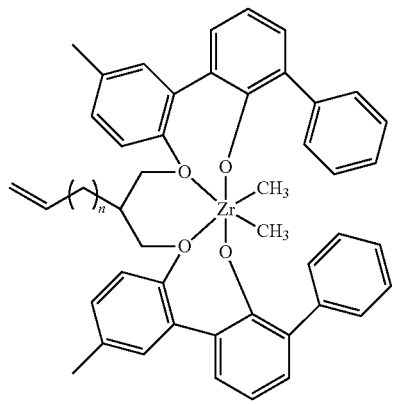

25
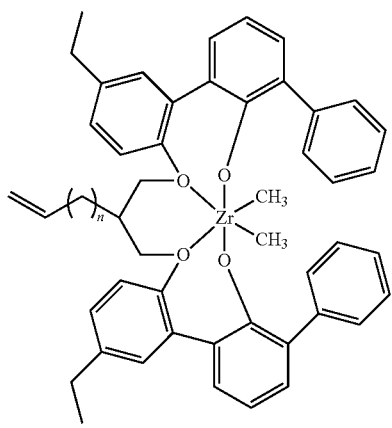
26
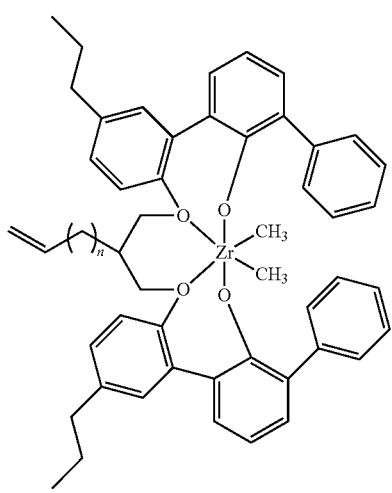
27
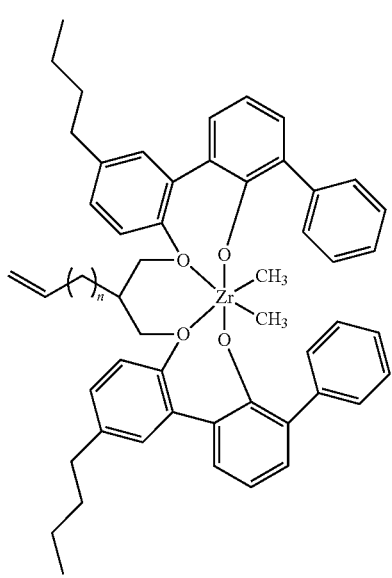
28
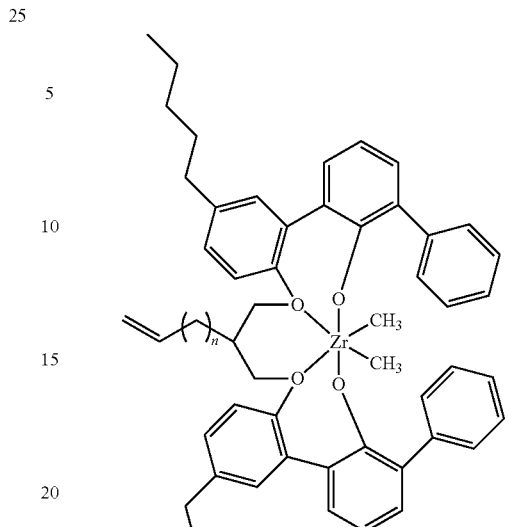
29
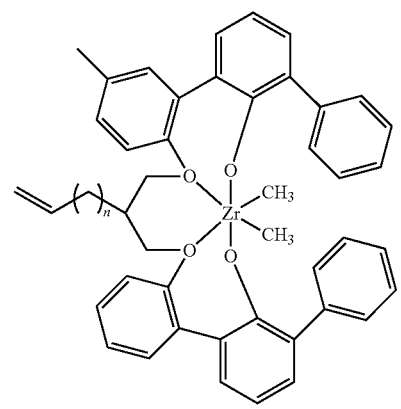
30
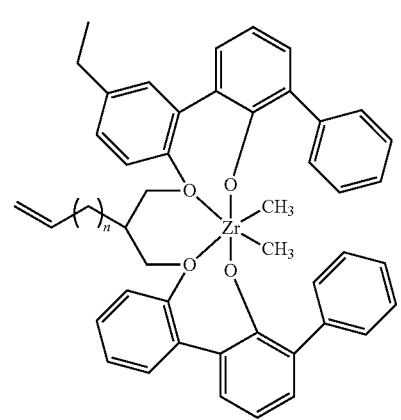

31
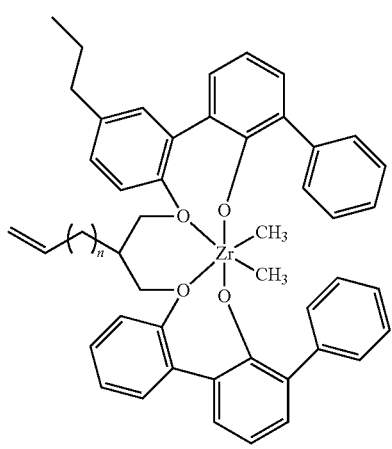
32
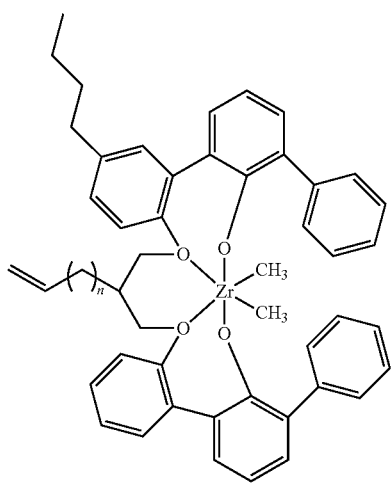
33
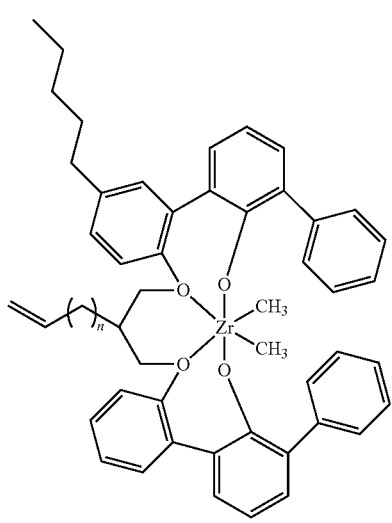
34
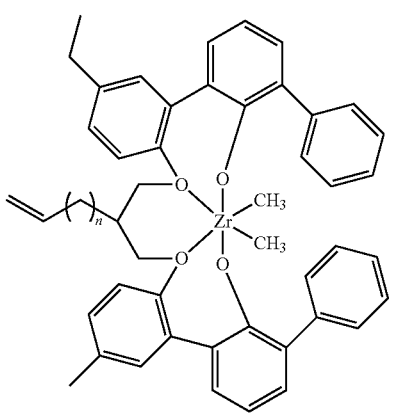
35
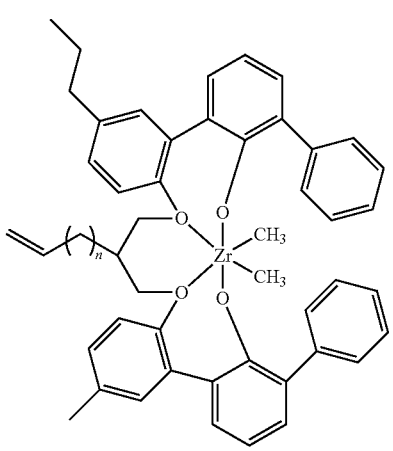
36
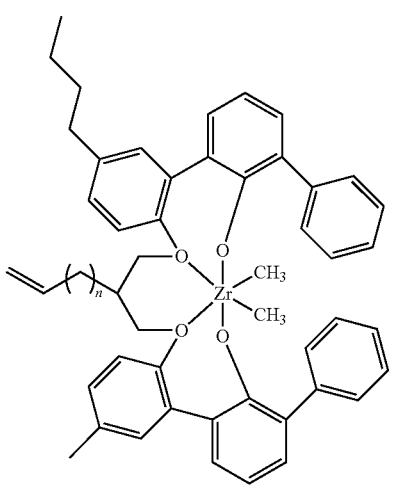

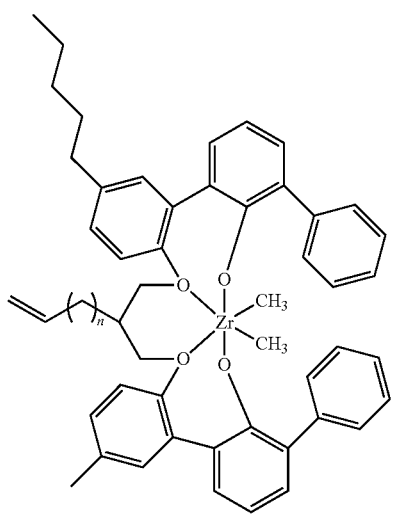
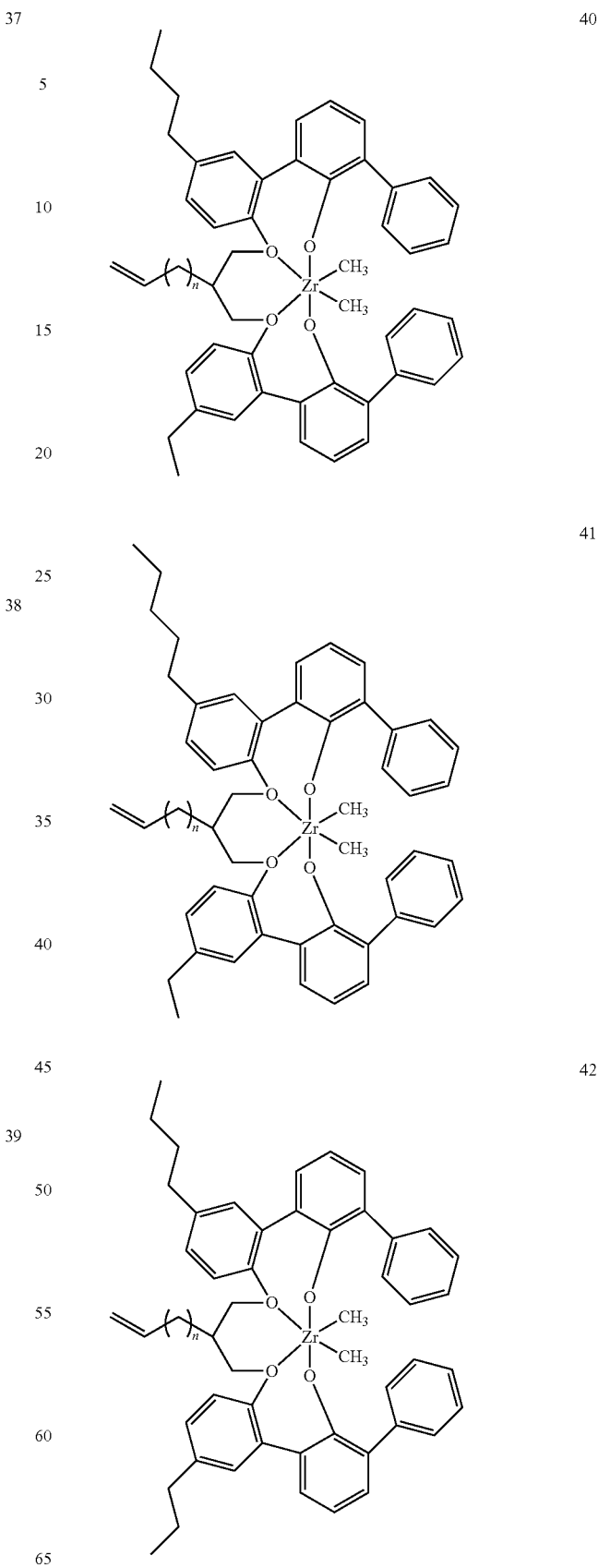

85
-continued
43
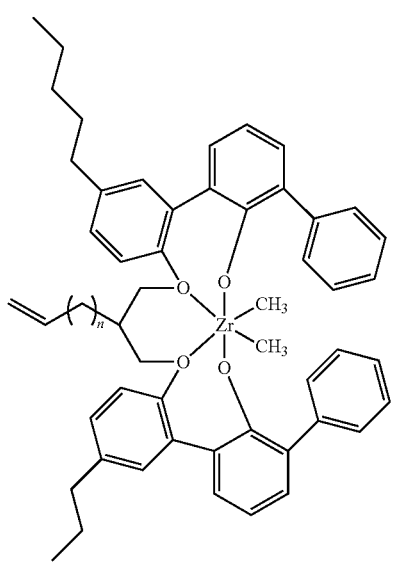
44
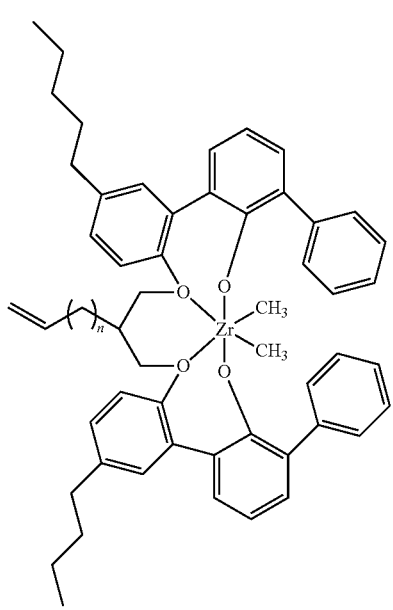
45
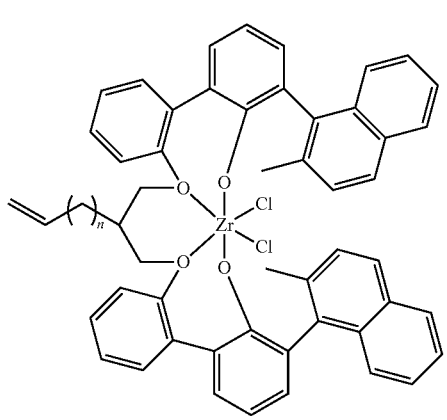
86
-continued
46
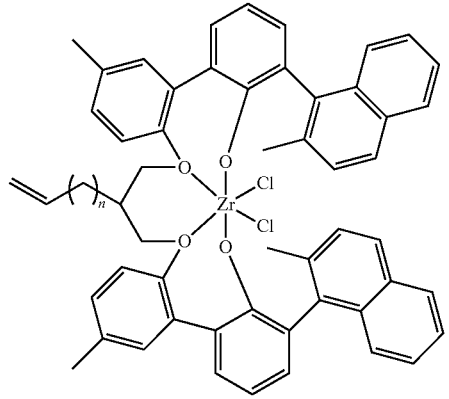
47
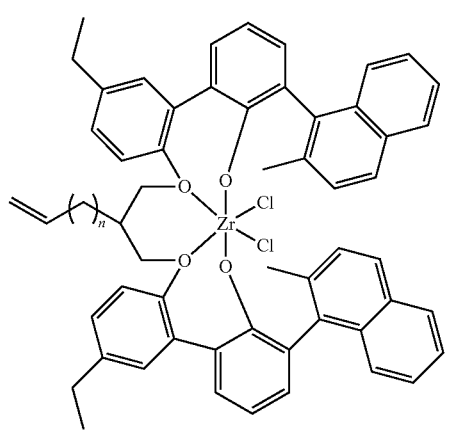
48
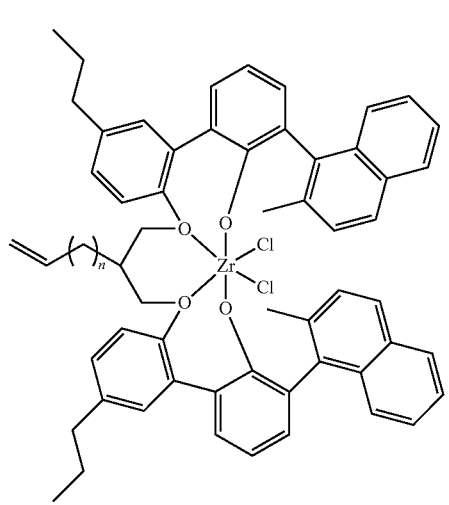

87
49
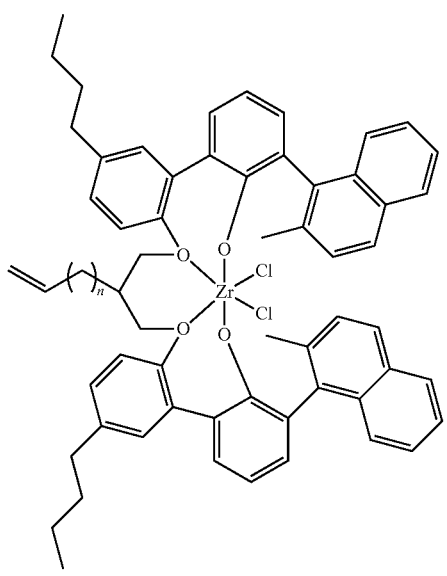
50
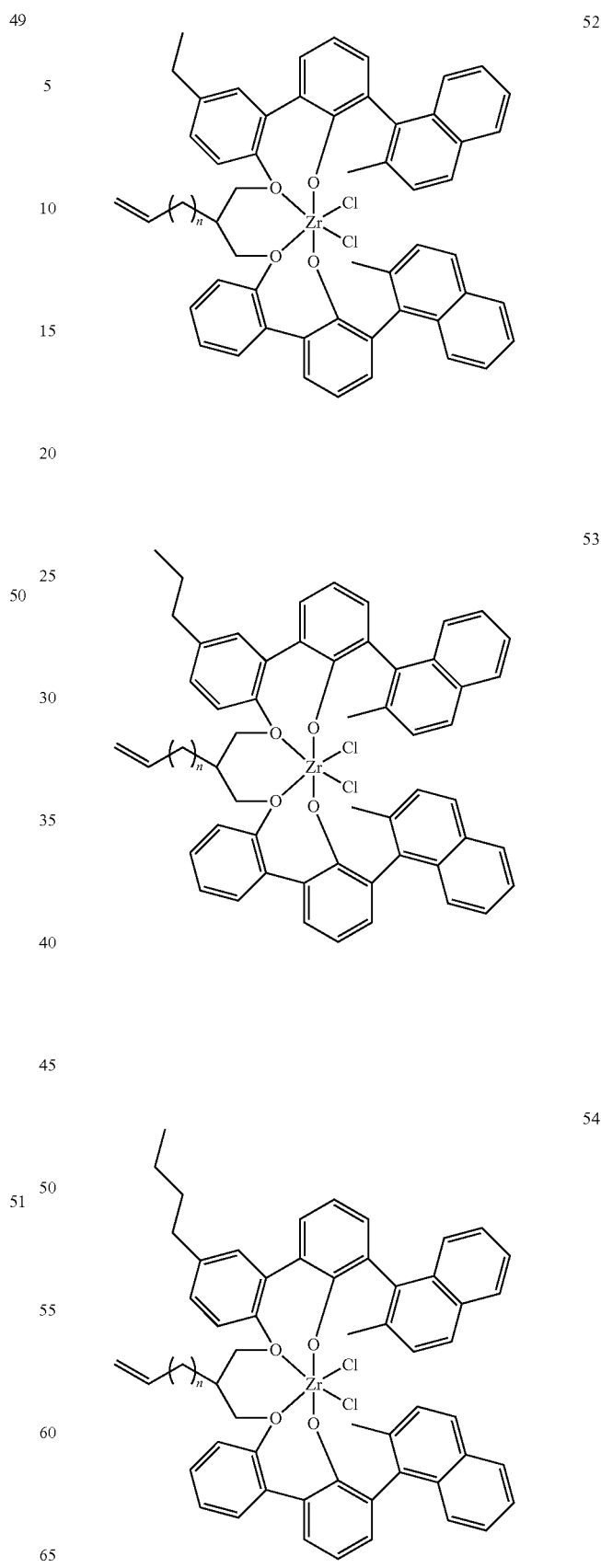
88

55
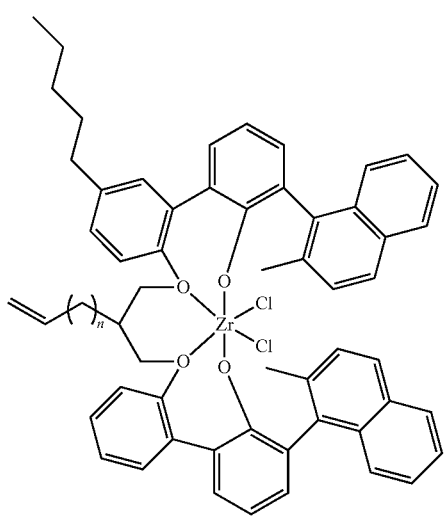
56
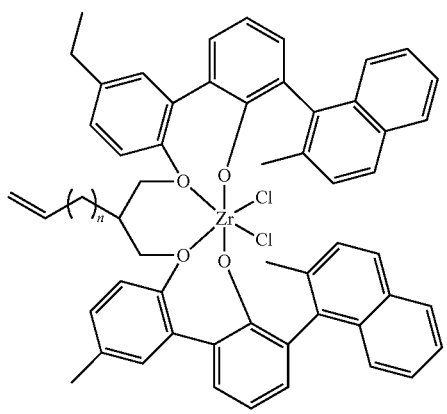
57
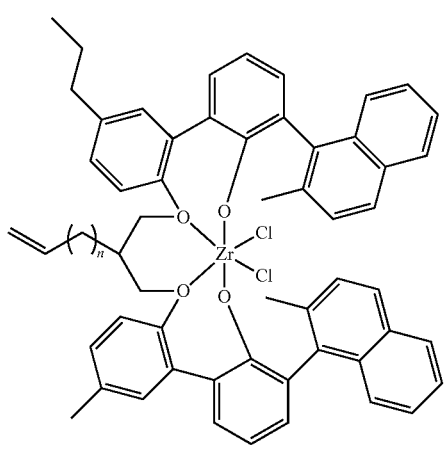
58
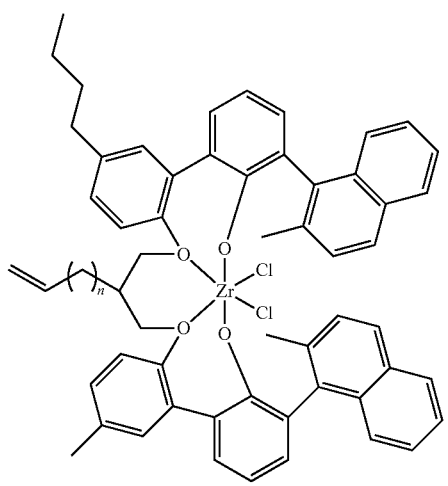
59
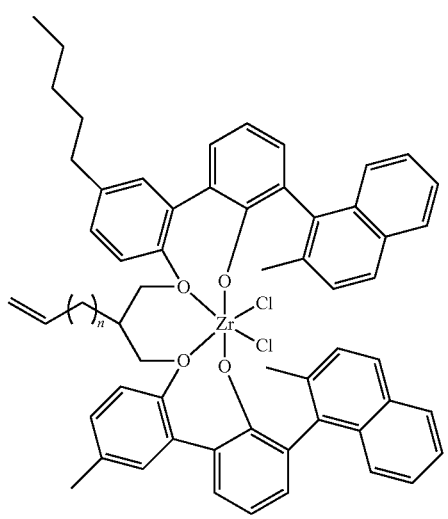
60
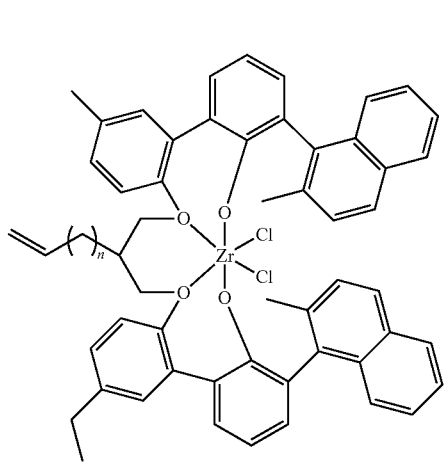

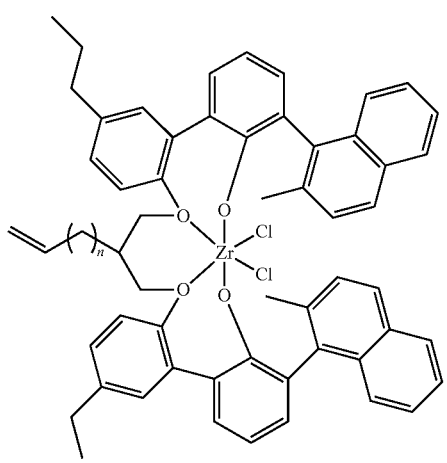
61
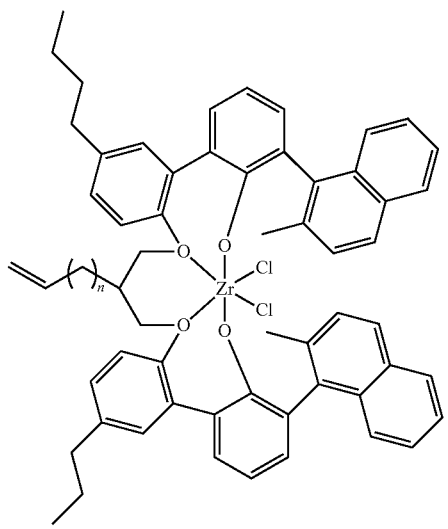
64
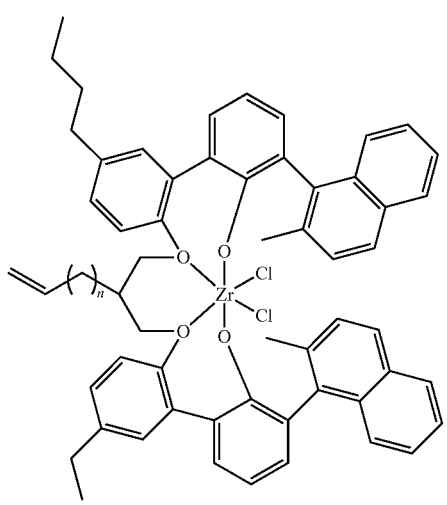
62
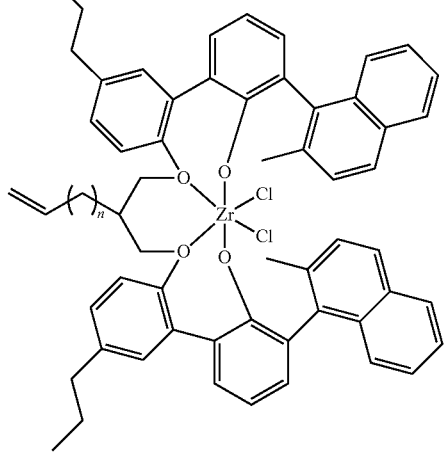
65
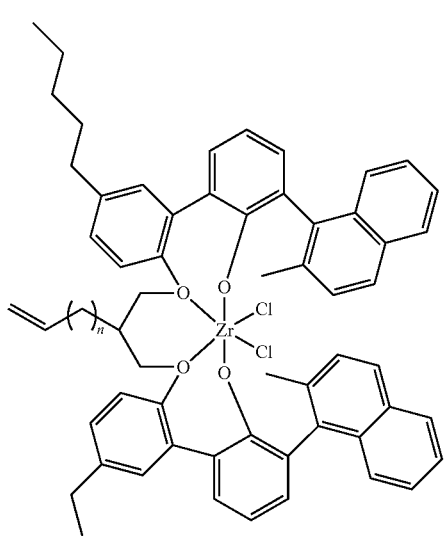
63
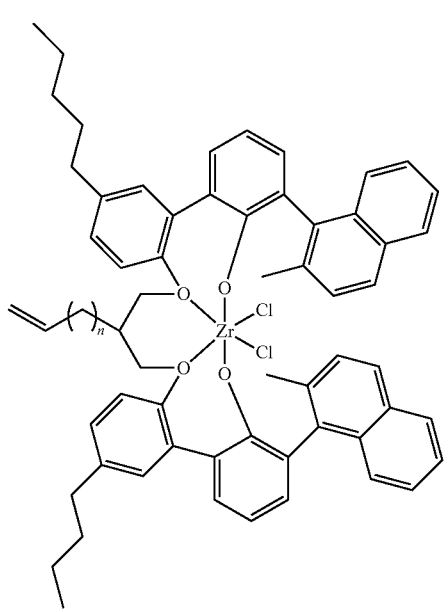
66

67
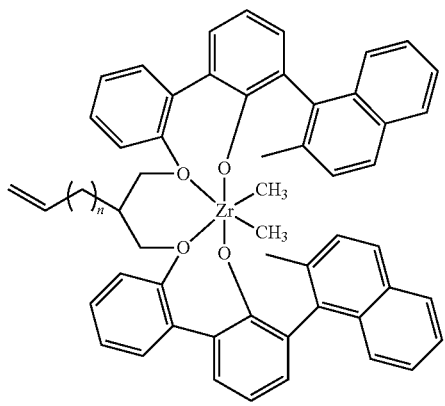
68
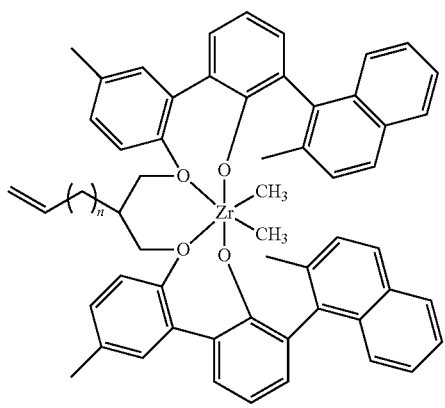
69
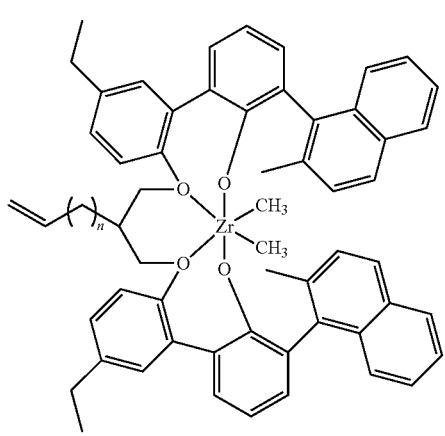
70
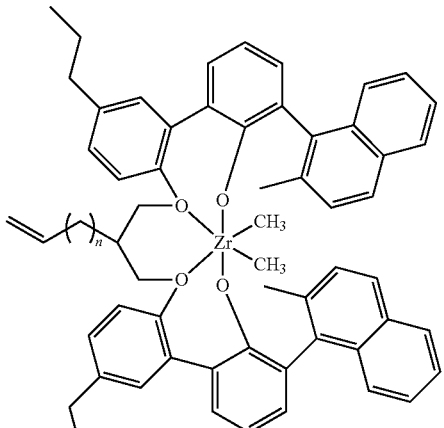
71
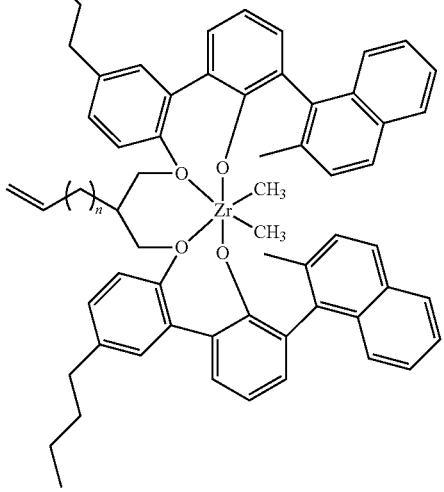
72
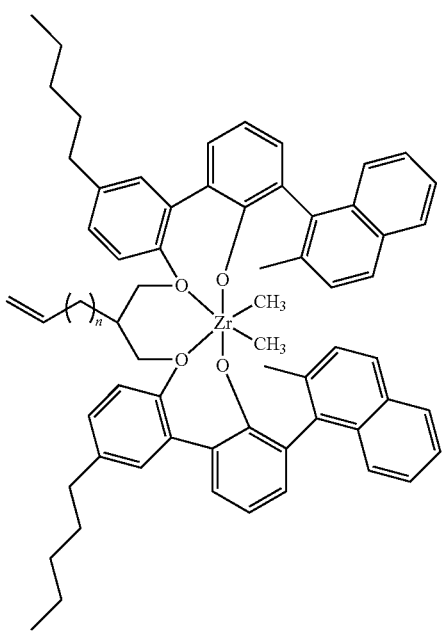

73
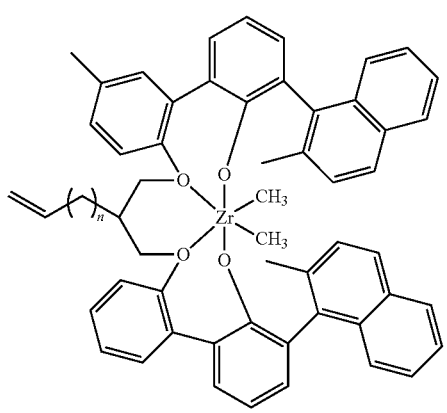
74
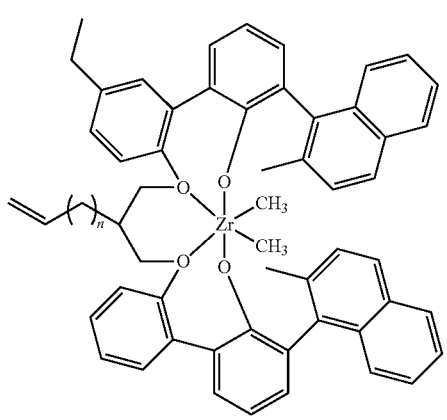
75
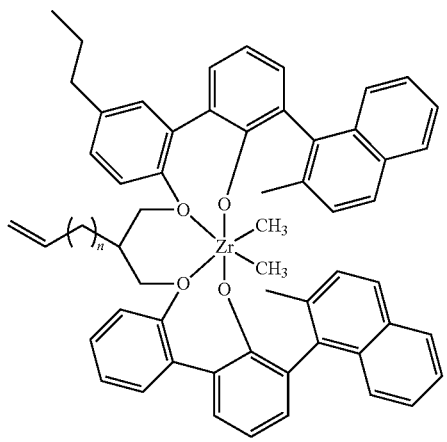
76
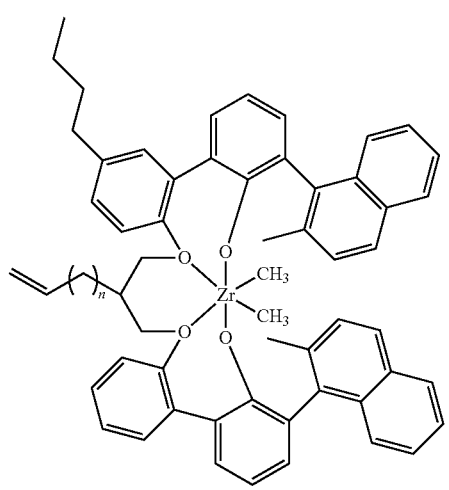
77
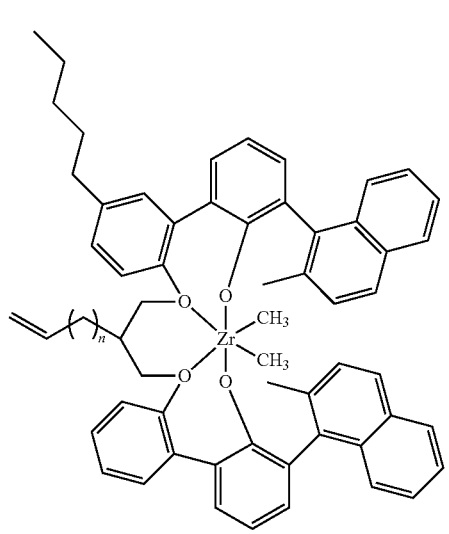
78
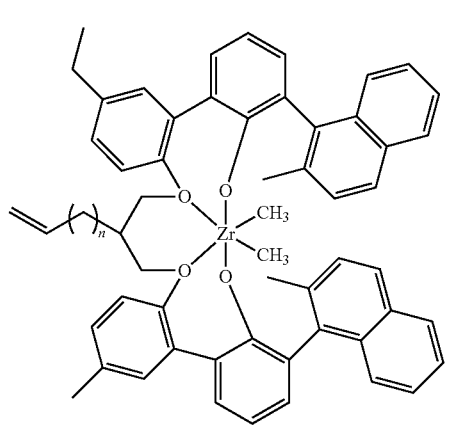

79
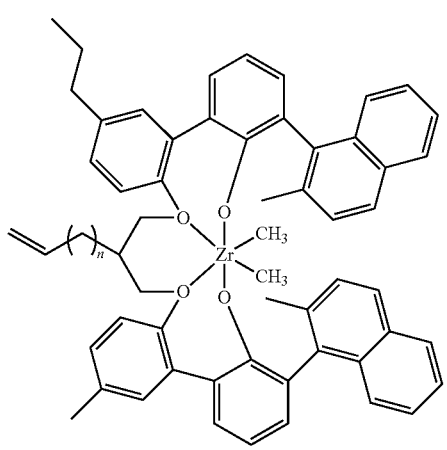
80
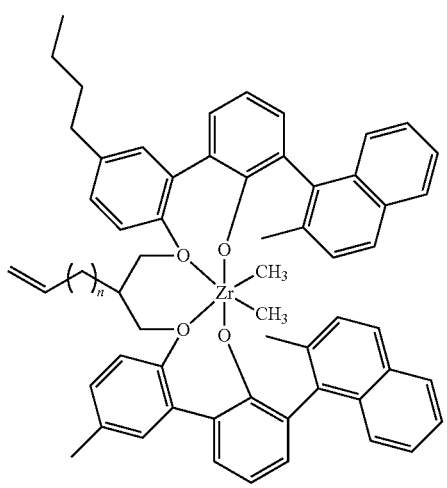
81
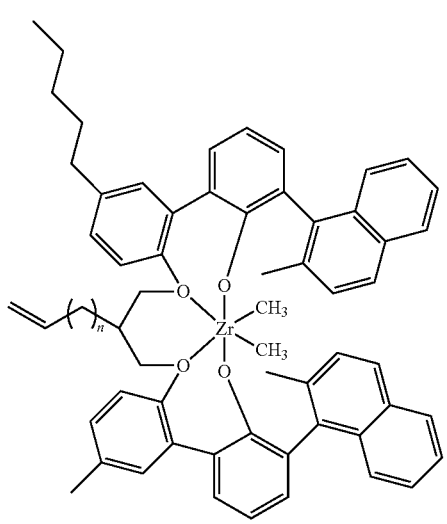
82
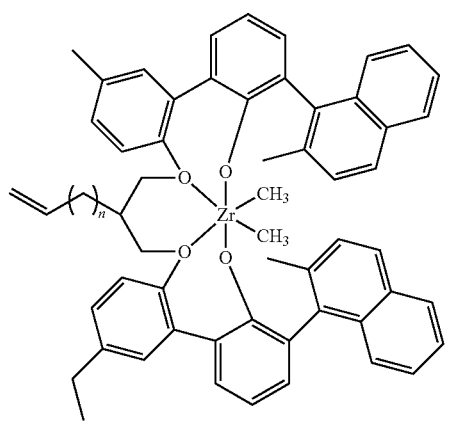
83
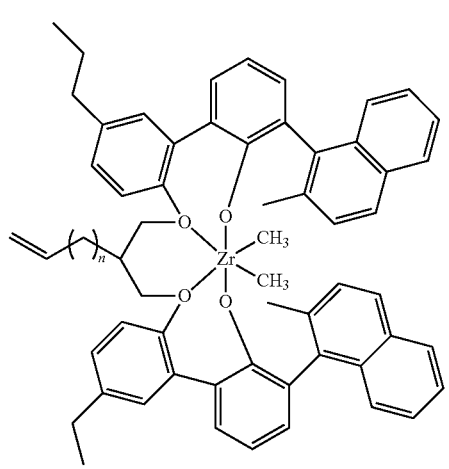
84
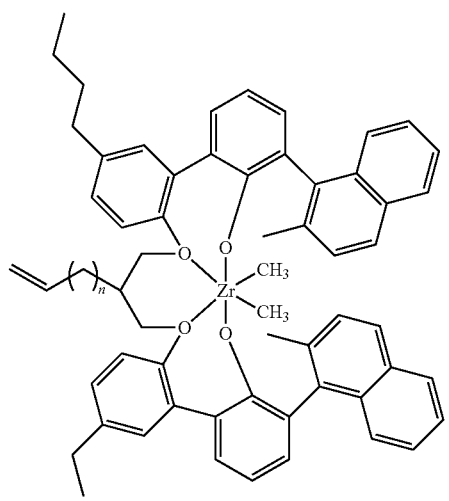

85
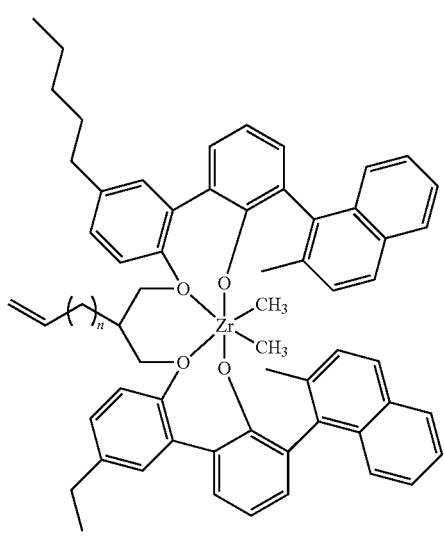
86
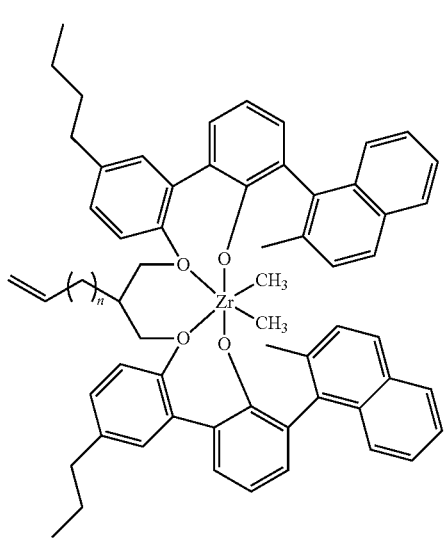
87
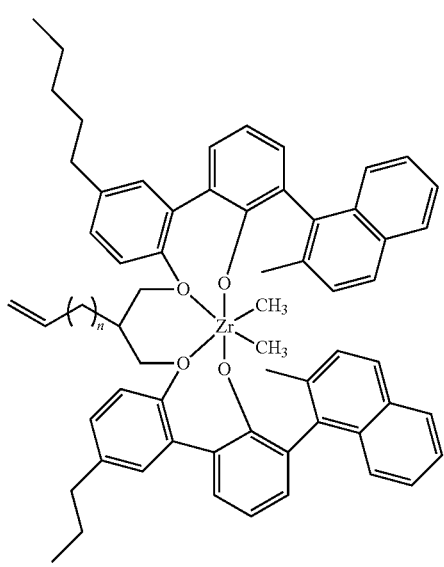
88
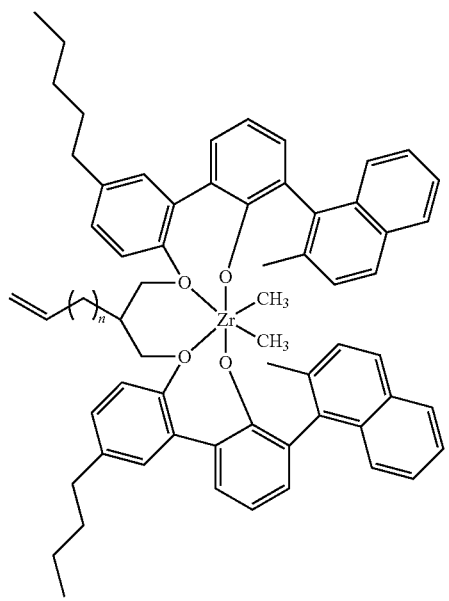
89
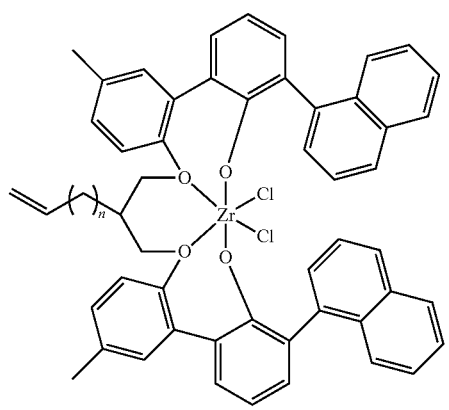
90
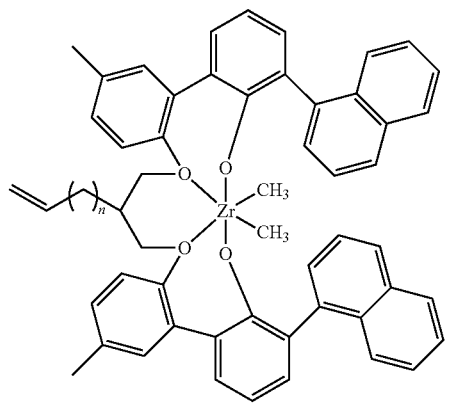
wherein n is an integer from 1 to 10.
14. The catalyst compound of claim 11, wherein the catalyst compound comprises one or more of:

101

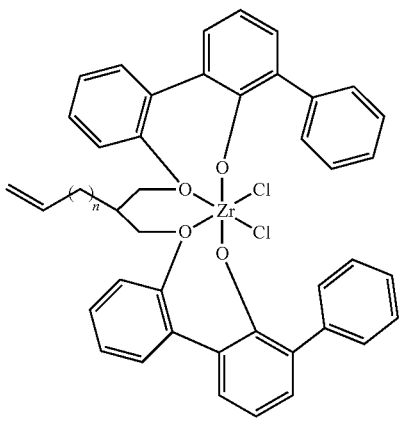
1

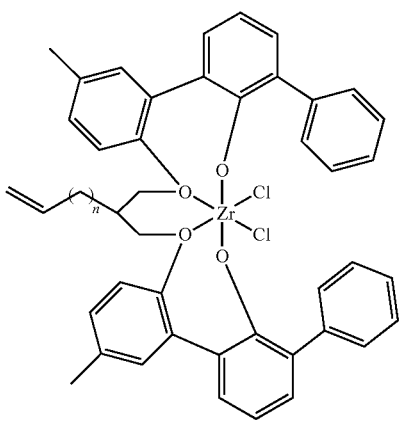
2

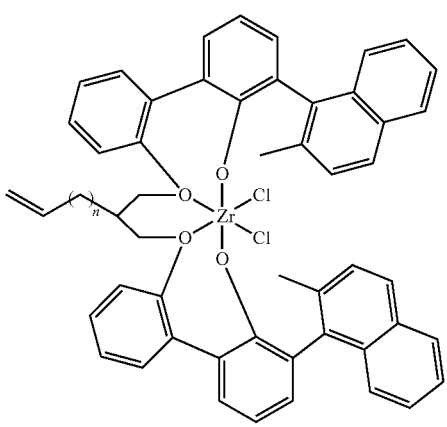
45

102

-continued

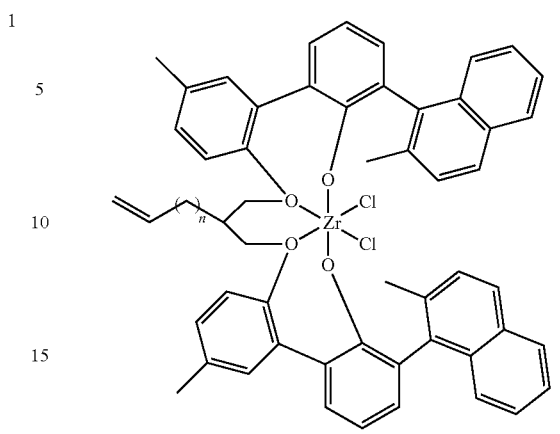
46

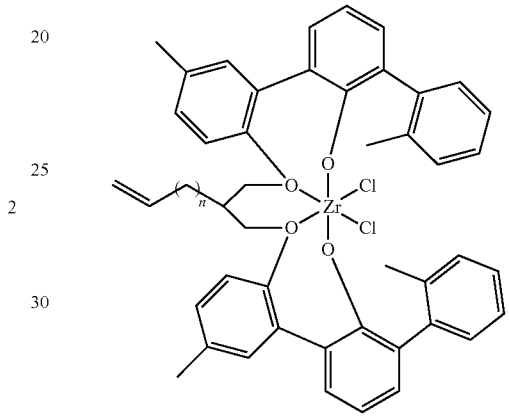
91

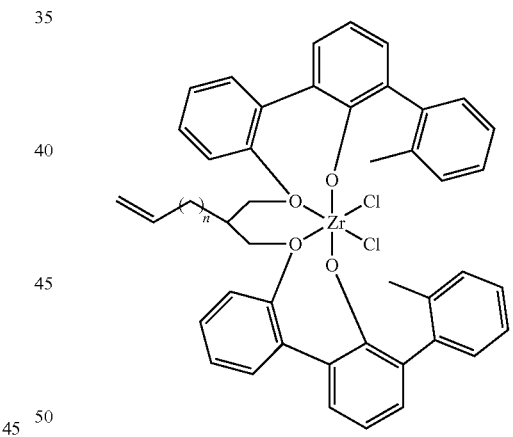
93 wherein n is an integer from 1 to 10.

15. A catalyst system comprising: (a) the catalyst compound of claim 1, and (b) an activator.

16. The catalyst system of claim 15, further comprising a support material.

17. The catalyst system of claim 15, further comprising a support material selected from the group consisting of Al$_2$O$_3$, ZrO$_2$, SiO$_2$, SiO$_2$/Al$_2$O$_3$, SiO$_2$/TiO$_2$, silica clay, silicon oxide/clay, or mixtures thereof.

18. The catalyst system of claim 15, wherein the activator comprises one or more of:
N,N-dimethylanilinium tetra(perfluorophenyl)borate,
N,N-dimethylanilinium tetrakis(perfluoronaphthyl)borate,
N,N-dimethylanilinium tetrakis(perfluorobiphenyl)borate, N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl)borate,
triphenylcarbenium tetra(perfluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate, and
tropillium tetrakis(perfluoronaphthyl)borate.

19. The catalyst system of claim 15, wherein the activator comprises an alkylalumoxane or triethyl aluminum.

20. The catalyst system of claim 15, wherein the support material comprises an electron-withdrawing anion.

21. The catalyst system of claim 15, further comprising: (c) a bridged or unbridged metallocene catalyst compound other than the catalyst compound of (a).

22. The catalyst system of claim 21, wherein the metallocene catalyst compound of (c) is an unbridged metallocene catalyst compound represented by the formula: $Cp^A Cp^B M'X'n$, wherein each $Cp^A$ and $Cp^B$ is independently selected from the group consisting of cyclopentadienyl ligands, one or both $Cp^A$ and $Cp^B$ may contain heteroatoms, and one or both $Cp^A$ and $Cp^B$ may be substituted by one or more R" groups, wherein M' is selected from the group consisting of Groups 3 through 12 atoms and lanthanide Group atoms, wherein X' is an anionic leaving group, wherein n is 0 or an integer from 1 to 4, wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

23. The catalyst system of claim 21, wherein the metallocene catalyst compound of (c) comprises one or more of:
bis(n-propylcyclopentadienyl)hafnium dichloride,
bis(n-propylcyclopentadienyl)hafnium dimethyl,
bis(n-propylcyclopentadienyl)zirconium dichloride,
bis(n-propylcyclopentadienyl)zirconium dimethyl,
bis(n-propylcyclopentadienyl)titanium dichloride,
bis(n-propylcyclopentadienyl)titanium dimethyl,
(n-propylcyclopentadienyl, pentamethylcyclopentadienyl)zirconium dichloride,
(n-propylcyclopentadienyl, pentamethylcyclopentadienyl)zirconium dimethyl,
(n-propylcyclopentadienyl, pentamethylcyclopentadienyl)hafnium dichloride,
(n-propylcyclopentadienyl, pentamethylcyclopentadienyl)hafnium dimethyl,
(n-propylcyclopentadienyl, pentamethylcyclopentadienyl)titanium dichloride,
(n-propylcyclopentadienyl, pentamethylcyclopentadienyl)titanium dimethyl,
(n-propylcyclopentadienyl, tetramethylcyclopentadienyl)zirconium dichloride,
(n-propylcyclopentadienyl, tetramethylcyclopentadienyl)zirconium dimethyl,
(n-propylcyclopentadienyl, tetramethylcyclopentadienyl)hafnium dichloride,
(n-propylcyclopentadienyl, tetramethylcyclopentadienyl)hafnium dimethyl,
(n-propylcyclopentadienyl, tetramethylcyclopentadienyl)titanium dichloride,
(n-propylcyclopentadienyl, tetramethylcyclopentadienyl)titanium dimethyl,
bis(cyclopentadienyl)zirconium dichloride,
bis(cyclopentadienyl)titanium dichloride,
bis(cyclopentadienyl)hafnium dichloride,
bis(cyclopentadienyl)zirconium dimethyl,
bis(cyclopentadienyl)titanium dimethyl,
bis(cyclopentadienyl)hafnium dimethyl,
bis(n-butylcyclopentadienyl)hafnium dichloride,
bis(n-butylcyclopentadienyl)hafnium dimethyl,
bis(n-butylcyclopentadienyl)zirconium dichloride,
bis(n-butylcyclopentadienyl)zirconium dimethyl,
bis(n-butylcyclopentadienyl)titanium dichloride,
bis(n-butylcyclopentadienyl)titanium dimethyl,
bis(pentamethylcyclopentadienyl)hafnium dichloride,
bis(pentamethylcyclopentadienyl)hafnium dimethyl,
bis(pentamethylcyclopentadienyl)zirconium dichloride,
bis(pentamethylcyclopentadienyl)zirconium dimethyl,
bis(pentamethylcyclopentadienyl)titanium dichloride,
bis(pentamethylcyclopentadienyl)titanium dimethyl,
bis(1-methyl-3-n-butylcyclopentadienyl)hafnium dichloride,
bis(1-methyl-3-n-butylcyclopentadienyl)hafnium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)titanium dichloride,
bis(1-methyl-3-n-butylcyclopentadienyl)titanium dimethyl, and the variants thereof where dimethyl above is replaced with diethyl, dibromide, or dibenzyl.

24. The catalyst system of claim 21, wherein the metallocene catalyst compound of (c) is a bridged metallocene catalyst compound represented by the formula:
$Cp^A(A)Cp^B M'X'n$, wherein each $Cp^A$ and $Cp^B$ is independently selected from the group consisting of cyclopentadienyl ligands, one or both $Cp^A$ and $Cp^B$ may contain heteroatoms, and one or both $Cp^A$ and $Cp^B$ may be substituted by one or more R" groups, wherein M' is selected from the group consisting of Groups 3 through 12 atoms and lanthanide Group atoms, wherein X' is an anionic leaving group, wherein n is 0 or an integer from 1 to 4, wherein (A) is selected from the group consisting of divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkyl thio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

25. The catalyst system of claim 15, wherein the support is silica.

26. A polymerization process comprising a) contacting one or more olefin monomers with a catalyst system comprising: i) activator and ii) the catalyst compound of claim 1.

27. A polymerization process comprising a) contacting one or more olefin monomers with a catalyst system comprising:

i) activator, and ii) the catalyst of claim 13.

28. The process of claim 26, wherein the one or more olefin monomers comprises ethylene and the polymerization process further comprises heating the one or more olefin monomers and the catalyst system to 74° C. or more to form polyethylene.

29. The process of claim 28, wherein the polyethylene has an Mw value from about 600,000 to about 1,000,000 g/mol and an Mw/Mn value of about 1.5 to about 5.

30. The catalyst compound of claim 1, wherein $M^1$ is zirconium; each of $Q^1$, $Q^2$, $Q^3$, and $Q^4$ is oxygen; $R^3$ is a $C_1$-$C_{40}$ unsaturated alkyl comprising a vinyl moiety; and at least one of $R^{11}$ and $R^{12}$ is substituted $C_6$-$C_{10}$ aryl.

31. A catalyst system comprising:

i) activator; and ii) the catalyst compound of claim 11.

32. A polymerization process comprising a) contacting one or more olefin monomers with a catalyst system comprising: i) activator and ii) the catalyst compound of claim 31.

* * * * *